US008399040B2

(12) United States Patent
Lundberg et al.

(10) Patent No.: US 8,399,040 B2
(45) Date of Patent: Mar. 19, 2013

(54) DAIRY PRODUCT COMPOSITIONS USING HIGHLY REFINED CELLULOSIC FIBER INGREDIENTS

(75) Inventors: Brock Lundberg, Osseo, WI (US); Amanda Huppert, River Falls, WI (US)

(73) Assignee: Fiberstar Bio-Ingredient Technologies, Inc., River Falls, WI (US)

( * ) Notice: Subject to any disclaimer, the term of this patent is extended or adjusted under 35 U.S.C. 154(b) by 0 days.

(21) Appl. No.: 13/151,923

(22) Filed: Jun. 2, 2011

(65) Prior Publication Data

US 2011/0268860 A1     Nov. 3, 2011

Related U.S. Application Data

(63) Continuation of application No. 11/484,263, filed on Jul. 11, 2006, now abandoned, and a continuation-in-part of application No. 11/165,430, filed on Jun. 23, 2005, now abandoned, which is a continuation-in-part of application No. 10/969,805, filed on Oct. 20, 2004, now abandoned, which is a continuation-in-part of application No. 10/288,793, filed on Nov. 6, 2002, now Pat. No. 7,094,317.

(60) Provisional application No. 60/698,301, filed on Jul. 12, 2005.

(51) Int. Cl.
    *A23C 9/00*     (2006.01)
    *A23C 9/154*     (2006.01)
    *A23L 1/05*     (2006.01)

(52) U.S. Cl. ......... 426/580; 426/615; 426/640; 426/573

(58) Field of Classification Search ................ 426/558, 426/549, 603, 573, 580, 615, 640
See application file for complete search history.

(56) References Cited

U.S. PATENT DOCUMENTS

| | | | |
|---|---|---|---|
| 3,993,793 A | 11/1976 | Finney | |
| 4,232,049 A | 11/1980 | Blake | |
| 4,333,953 A | 6/1982 | Trzecieski | |
| 4,413,017 A | 11/1983 | Loader | |
| 4,552,773 A | 11/1985 | Kahn et al. | |
| 4,629,575 A | 12/1986 | Weibel | |
| 4,774,099 A | 9/1988 | Feeney et al. | |
| 4,831,127 A | 5/1989 | Weibel | |
| 4,853,243 A | 8/1989 | Kahn et al. | |
| 4,923,981 A | 5/1990 | Weibel et al. | |
| 5,190,776 A | 3/1993 | Baumann | |
| 5,360,627 A | 11/1994 | Desai et al. | |
| 5,403,611 A | 4/1995 | Tomita et al. | |
| 5,439,697 A | 8/1995 | Gonzalez-Sanz | |
| 5,487,419 A | 1/1996 | Weibel | |
| 5,656,320 A | 8/1997 | Cheng et al. | |
| 5,658,609 A | 8/1997 | Abboud et al. | |
| 5,680,769 A | 10/1997 | Katz | |
| 5,766,662 A | 6/1998 | Inglett | |
| 5,846,579 A | 12/1998 | Hagerman et al. | |
| 5,902,625 A | 5/1999 | Barz et al. | |
| 5,925,398 A | 7/1999 | Rizvi et al. | |
| 5,952,022 A | 9/1999 | Veal | |
| 5,964,983 A | 10/1999 | Dinand et al. | |
| 6,048,564 A | 4/2000 | Young et al. | |
| 6,096,352 A | 8/2000 | Kijowski et al. | |
| 6,177,118 B1 | 1/2001 | Blazey et al. | |
| 6,251,458 B1 | 6/2001 | Weibel | |
| 6,558,729 B1 | 5/2003 | Riviere et al. | |
| 6,607,777 B1 | 8/2003 | Walsh et al. | |
| 2003/0044509 A1 | 3/2003 | Roney et al. | |
| 2003/0144245 A1 | 7/2003 | Addis et al. | |
| 2004/0062851 A1 | 4/2004 | Bender | |
| 2004/0086626 A1 | 5/2004 | Lundberg et al. | |
| 2005/0233044 A1 | 10/2005 | Rader et al. | |
| 2005/0271790 A1 | 12/2005 | Aronson | |

FOREIGN PATENT DOCUMENTS

WO     WO 0132978 A1 *   5/2001

OTHER PUBLICATIONS

Wikipedia.com, Kraft Dinner, Printed on Sep. 10, 2008.*
Haard and Chism, "Characteristics of Edible Plant Tissues," 1996, Food Chemistry; pp. 944-1011; Ed. by Fennema. Marcel Dekker NY, NY.
Gu, L., R Ruan, P. Chen, W. Wilcke, P. Addis. 2001. "Structure Function Relationships of Highly Refined Cellulose." Transactions of the ASAE. vol. 44(6);: pp. 1707-1712.
Herbafood Press Report: Improved Fruit Fibers for Modern Food Processing. Herbafood Ingredients GmbH May/Jun. 2001.
Wikipedia.com, Draft Dinner, Printed on Sep. 10, 2008.
Random House Compact Unabridged Dictionary, Special Second Edition. Definition of the word "mix."
Jon DeVries, "Dietary Fiber Analytical Aspects," Technical Bulletin, Medallion Labs, http://www.medallionlabs.com/Downloads/dietary_fiber_analytical_a.pdf.

* cited by examiner

*Primary Examiner* — Jyoti Chawla
(74) *Attorney, Agent, or Firm* — Mark A. Litman & Associates, P.A.

(57) ABSTRACT

A composition of matter is used as an ingredient in making dairy-containing products, especially cheeses, cheese spreads, cheese sauces, ice cream, ice milk, yogurt, sherbet, milk shakes, and the like. The product can replace shortenings and fats and oils, and can be used in these dairy products. A highly refined cellulosic materials (e.g., cellulose, modified celluloses, derivatized celluloses, hemicellulose, lignin, etc.) product can be prepared by generally moderate treatment and still provide properties that are equivalent to or improved upon the properties of the best highly refined cellulose products produced from more intense and environmentally unfriendly processes. Fruit or vegetable cells with an exclusively parenchymal cell wall structure can be treated with a generally mild process to form highly absorbent microfibers.

14 Claims, 2 Drawing Sheets

DAIRY PRODUCT COMPOSITIONS USING HIGHLY REFINED CELLULOSIC FIBER INGREDIENTS

RELATED APPLICATIONS DATA

This application is a Continuation of U.S. patent application Ser. No. 11/484,263, filed Jul. 11, 2006, which claims priority from U.S. Provisional Application 60/698,301, filed Jul. 12, 2005 and is a continuation-in-part of U.S. patent application Ser. No. 11/165,430, filed Jun. 23, 2005 (Titled "REDUCED FAT SHORTENING, ROLL-IN, AND SPREADS USING CITRUS FIBER INGREDIENTS"), which is a continuation-in-part of U.S. patent application Ser. No. 10/969,805, filed 20 Oct. 2004, and titled "HIGHLY REFINED CELLULOSIC MATERIALS COMBINED WITH HYDROCOLLOIDS," which is a continuation-in-part of U.S. patent application Ser. No. 10/288,793, filed Nov. 6, 2002, titled "HIGHLY REFINED FIBER MASS, PROCESS OF THEIR MANUFACTURE AND PRODUCTS CONTAINING THE FIBERS."

BACKGROUND OF THE INVENTION

1. Field of the Invention

The present invention relates to the field of additives to dairy containing products, especially solid or gelatinous dairy products, and more especially-containing products, such as ice cream, cheeses, cheese spreads, yogurts, frozen yogurt, dairy-based gelatin and other more solid dairy-based goods for human or other animal consumption, particularly additives that can reduce the fat content of such flour products while maintaining perceived taste and sensory quality in the diary-based product.

2. Background of the Art

Published articles from FDA, American Heart Association, and Harvard all tie a link between trans fats and saturated fats with increased LDL (bad cholesterol) and thus, heart disease. Beginning in January 2006, FDA will require food companies to list the amount of trans fatty acids on their labels. To lower the trans fat levels in foods, shortening suppliers have introduced low trans fat shortenings. However, within the newer compositions that have been provided for low trans shortenings there is an increase in the amount of saturated fats. In a typical shortening the saturated fat goes from 26% in standard shortening to 40% in low trans shortenings. Therefore, while shortening suppliers are trying to offer a healthier product a product with lower the trans fat, there is a trade-off with the increased saturated fats that raises concerns with regard to the saturated fat ingredient. For companies concerned about keeping trans fats off their labels, a company that switches to a low trans/higher saturated fat shortening for certain high fat products, e.g. cakes, donuts, etc, will still need to label an amount of trans fatty acids and also indicate a higher level of saturated fats.

U.S. Pat. Nos. 6,251,458; 5,487,419; 4,923,981; 4,831,127; 4,629,575, Weibel) relates to material additives. U.S. Pat. No. 4,923,981 relates more to issues of fat replacement describes using expanded parenchymal cell cellulose (PCC) for fat reduction. However, this Weibel patent specifically talks about making PCC through a process that uses alkaline or acid conditions. Additionally, the patent does not give a method for drying the product nor enable using a dried and expanded PCC, whereas the product used in the present technology is in a dried form.

U.S. Pat. No. 5,964,983 (Dinand) uses alkaline and/or acid conditions to make their microfibrillated cellulose. Dinand discloses the use of alkaline and/or acid conditions to make microfibrillated cellulose, and also does not disclose the combination of water, fiber and shortening directly together to make a reduced fat shortening, oil, margarine, or butter.

U.S. Pat. No. 5,766,662 (Inglett) describes replacing fat, but specifically states that the fat replacement product is the product made according to his invention is a product made through the combination of mechanical and chemical processes. Additionally, the dry product he makes needs to be sheared in a shearing device, i.e., a high speed blender, before the product can be used for fat replacement. This work does not disclose the direct combination of water, fiber, and shortening together to make a reduced fat shortening, oil, margarine, or butter.

In considering the Weibel patents (U.S. Pat. Nos. 6,251,458; 5,487,419; 4,923,981; 4,831,127; and 4,629,575), only U.S. Pat. No. 4,923,981 appears to have relevant disclosure with respect to fat replacement using expanded parenchymal cell cellulose (PCC) for fat reduction. The resulting product is not a reduced fat shortening, spread, roll-in, butter, or oil, but is a compounded product. Additionally, this patent specifically talks about making PCC through a process that uses alkaline or acid conditions. Weibel also does not give a method for drying fiber, which is a very significant and important step in the process of providing a highly refined cellulose fiber, and especially a highly refined cellulose fiber from citrus pulp and material with high parenchymal content. Weibel does not disclose using a dried and expanded PCC Several other prior art sources (U.S. Pat. Nos. 5,658,609, 5,190,776, 5,360,627, 5,439,697, 6,048,564) state the concept of a reduced fat shortening, margarine, spread, roll-in, butter, or oil but they are made with either combinations of modified starches, gums, emulsifiers, or combinations of other ingredients as opposed to the object of this invention is to do the fat reduction using an expanded cell wall cellulose and water.

SUMMARY OF THE INVENTION

A composition of matter is used as an ingredient in cooking comprising 1-30% by weight of highly refined cellulose fiber, 20-85% by weight animal consumable oils or fats and 5-40% by weight of water. The product can replace shortenings and fats and oils, and can be used in baked, fried, extruded and frozen products.

DETAILED DESCRIPTION OF THE INVENTION

Figure 1:
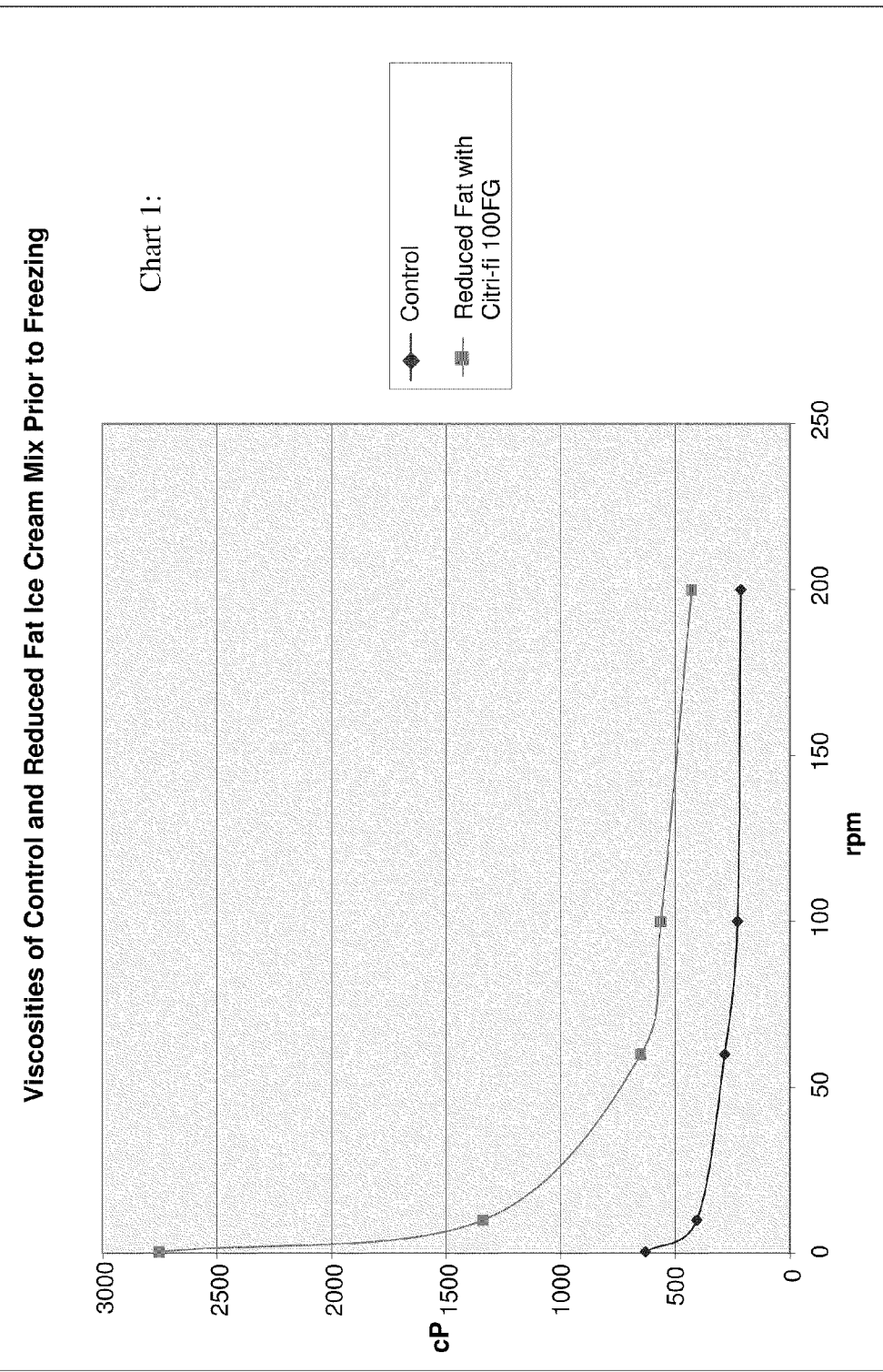
FIG. 1 is a chart of viscosity of control and reduced fat Ice Cream.
Figure 2:
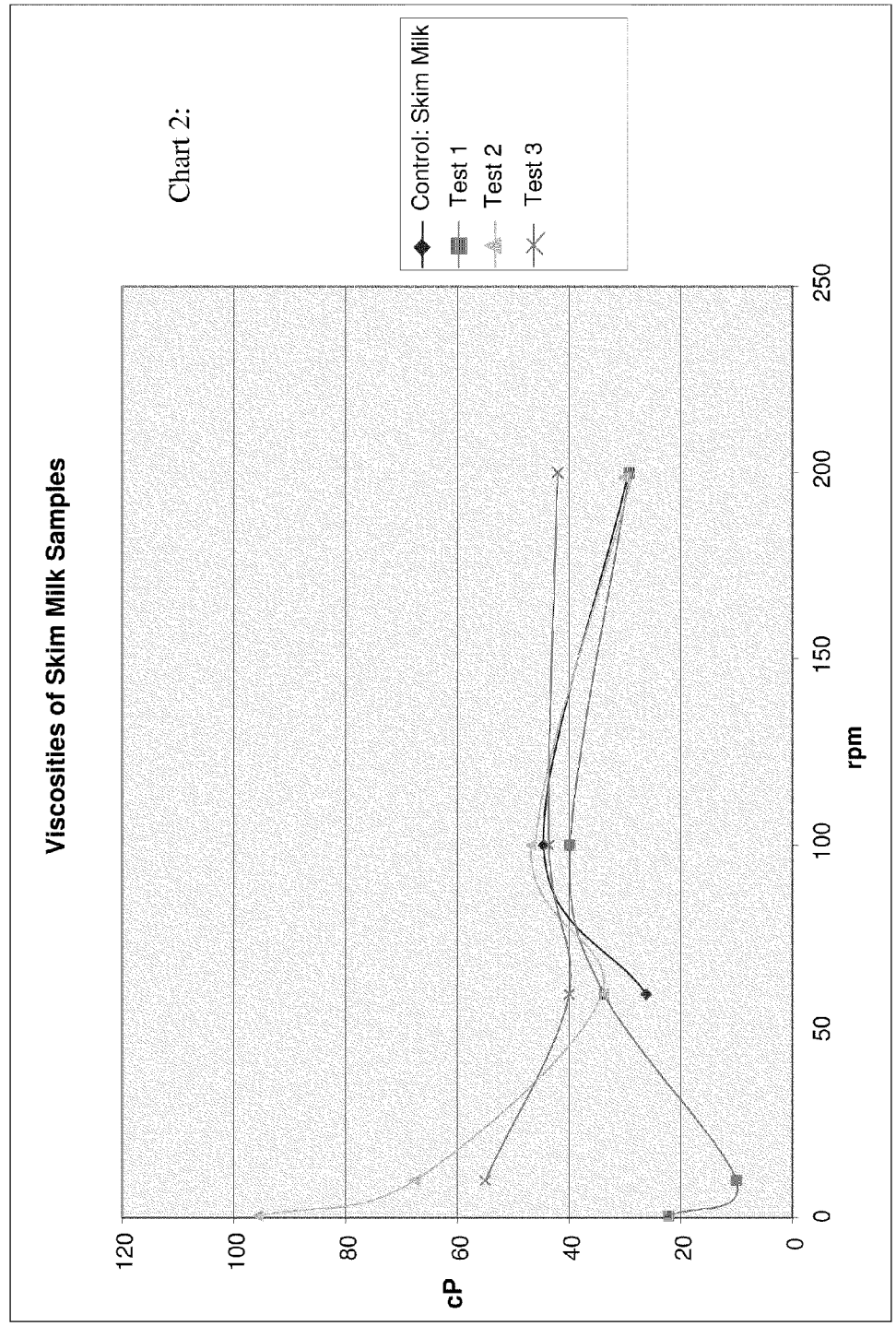
FIG. 2 is a chart of skim milk viscosities.

A highly refined cellulosic materials (e.g., cellulose, modified celluloses, derivatized celluloses, hemicellulose, lignin, etc.) product can be prepared by generally moderate treatment and still provide properties that are equivalent to or improved upon the properties of the best highly refined cellulose products produced from more intense and environmentally unfriendly processes. Fruit or vegetable cells with an exclusively parenchymal cell wall structure can be treated with a generally mild process to form highly absorbent microfibers. Cells from citrus fruit and sugar beets are particularly available in large volumes to allow volume processing to generate highly refined cellulose fibers with both unique and improved properties. These exclusively parenchymal microfibers (hereinafter referred to as EPM's) have improved moisture retention and thickening properties that enable the fibers to provide unique benefits when combined into edible products (e.g., baked goods, liquefied foods, whipped foods, meats, meat fillers, dairy products, yogurt, frozen food entrees, ice cream, etc.) and in mixtures that can be used to generate edible food products (e.g., baking ingredients, dehydrated or low hydration products).

Ice-cream is a food composition comprising milk, cream or water, sweetening agents, flavourings, binding agents and emulsifying agents, which is brought to the solid or semi-solid state by freezing. In the preparation of ice-cream by industrial freezers or by means of devices for domestic use, the ice-cream mix, or rather the food composition on which the ice-cream is based, is subjected to agitation and beating under intense refrigeration for the purpose of causing the incorporation of air into the composition before or during freezing. Thanks to the presence of small air bubbles the ice-cream melts rapidly in the consumer's mouth giving a pleasant sensation of freshness and at the same time avoiding any unpleasant and excessive cooling of the mouth and teeth.

Industrial ice-cream is typically sold in a form ready for consumption or rather is preserved in a packaged form or in bulk under refrigeration and is removed from the refrigerated environment before being consumed. This involves the necessity for refrigerated transport both in the industrial distribution chain and on the part of the consumer after having acquired it; the possible liquefaction during transport involves a substantial loss of the organoleptic properties in that the subsequent freezing effected after a partial accidental unfreezing or liquefaction involves an unacceptable increase in the consistency.

A new process for making HRC cellulose from parenchyma cell wall products, e.g. citrus fruit and sugar beets by-products, is performed in the absence of a hydroxide soaking step. This is a significant advance over the prior art as described by the Chen and Lundberg patents. Dinand, et al. (U.S. Pat. No. 5,964,983) also recommends the use of a chemical treatment step in addition to bleaching. In the present invention we are able to attain higher functionality (measured as viscosity) compared to Dinand et al. even though we use less chemical treatment, which is likely due to the higher amount of shear and chemical energy we put into the materials. The product is able to display the same or improved water retention properties and physical properties of the more strenuously refined agricultural products of the prior art, and in some cases can provide even higher water retention values, thickening and other properties that can produce unique benefits in particular fields of use.

General descriptions of the invention include a highly refined cellulose product comprising microfibers derived from organic fiber plant mass comprising at least 50% by weight of all fiber mass as parenchymal fiber mass, the highly refined cellulose product having an alkaline water retention capacity of at least about 25 g $H_2O$/g dry highly refined cellulose product and methods for providing and using these products. The highly refined cellulose product may have a water retention capacity of at least 50 g $H_2O$/g dry highly refined cellulose product.

Parenchymal cell walls refer to the soft or succulent tissue, which is the most abundant cell wall type in edible plants. For instance, in sugar beets, the parenchyma cells are the most abundant tissue the surrounds the secondary vascular tissues (xylem and phloem). Parenchymal cell walls contain relatively thin cell walls compared to secondary cell walls are tied together by pectin (Haard and Chism, 1996, Food Chemistry. Ed. By Fennema. Marcel Dekker NY, N.Y.) In secondary cell walls (xylem and phloem tissues), the cell walls are much thicker than parenchymal cells and are linked together with lignin (Smook). This terminology is well understood in the art.

As used in the practice of the present invention, the term "dry" or "dry product" refers to a mass that contains less than 15% by weight of fibers as water.

The organic fiber mass comprises at least 50% by weight of fiber mass from organic products selected from the group consisting of sugar beets, citrus fruit, grapes, tomatoes, chicory, potatoes, pineapple, apple, carrots, cranberries and other fiber sources both from parenchymal and non parenchymal plant cells. A food product or food additive may have at least 0.05 percent by weight solids in the food product or food additive of the above described highly refined cellulose product. The food product may also have at least about one percent or at least about two percent by weight of the highly refined cellulosic fiber of the invention.

A method for refining cellulosic material may comprise:

soaking raw material from organic fiber plant mass comprising at least 50% by weight of all fiber mass as parenchymal fiber mass in an aqueous solution with less than 1% NaOH;

draining the raw material and allowing the raw material to sit for a sufficient period under conditions (including ambient conditions of room temperature and pressure as well as accelerated conditions) so that the fibers and cells are softened so that shearing can open up the fibers to at least 40%, at least 50%, at least 60%, or at least 70, 80, 90 or 95% of their theoretic potential. This will usually require more that 4 hours soaking to attain this range of their theoretic potential. It is preferred that this soaking is for more than 5 hours, and preferably for at least about 6 hours. This soaking time is critical to get the materials to fully soften. When such a low alkaline concentration is used in the soaking, without the set time, the materials do not completely soften and can not be sheared/opened up to their full potential. This process produces soaked raw materials; and the process continues with refining the soaked raw material to produce refined material; and drying the soaked raw material.

The process may perform drying by many different commercial methods, although some display improved performance in the practice of the present invention. It is preferred that drying is performed, at least in part, by fluid bed drying or flash drying or a combination of the two. An alternative drying process or another associated drying step is performed at least in part by tray drying. For example, fluid bed drying may be performed by adding a first stream of organic fiber plant mass and a second stream of organic fiber plant mass into the drier, the first stream having a moisture content that is at least 10% less than the moisture content of the second stream or organic fiber plant mass. The use of greater differences in moisture content (e.g., at least 15%, at least 20%, at least 25%, at least 40%, at least 50% weight-to-weight water percent or weight-to-weight water-to-solid percent) is also within the scope of practice of the invention. In the drying method, the water may be extracted with an organic solvent prior to drying. In the two stream drying process, the second stream of organic fiber plant mass may have at least 25% water to solids content and the first stream may have less than 15% water to solids content. These processes may be practiced as batch or continuous processes. The method may use chopping and washing of the cellulose mass prior to soaking.

Another description of a useful process according to the invention may include draining and washing the soaked raw material in wash water to produce washed material; bleaching the washed material in hydrogen peroxide to produce a bleached material; and washing and filtering the bleached material to produce a filtered material.

The drying of an expanded fiber material according to the invention may use room temperature or higher air temperatures that dry the expanded fiber product and maintain the fiber material's functionalities of at least two characteristics of surface area, hydrogen bonding, water holding capacity and viscosity. It is also useful to use backmixing or evaporating to bring the organic fiber plant mass to a solids/water ratio that will fluidize in air in a fluid bed air dryer. This can be particularly performed with a method that uses a fluid bed dryer or flash dryer to dry the expanded or highly refined cellulosic fiber product.

The use of a flash or fluid bed dryer is an advantage over the drying methods suggested by Dinand et al. We have found that through the use of a fluid bed or flash dryer, low temperatures and controlled humidity are not needed to dry the materials of the present invention. In fact, although nearly any drying temperature in the fluid bed or flash dryer can be used, we have dried the product of the present invention using high air temperatures (400 F) and attained a dry product with near equivalent functional properties after rehydration compared to the materials before drying. Additionally, using the process of the present invention, any surface area expanded cellulosic product can be dried and a functional product obtained and is not limited to parenchyma cell wall materials. The use of a fluid bed or flash dryer, the use of relatively high drying air temperatures (400 F+), and the ability to dry non parenchyma cell wall (secondary cell) and obtain a functional product is in great contrast to the relatively low temperatures, e.g. 100 C (212 F) and dryer types taught by Dinand et al to dry expanded parenchymal cell wall materials.

The University of Minnesota patent application (Lundberg et al), describes the ability to obtain a functional dried product. However, the only way they were able to obtain a functional dry product was through freeze drying (Gu et al, 2001) .—from (Gu, L., R Ruan, P. Chen, W. Wilcke, P. Addis. 2001. *Structure Function Relationships of Highly Refined Cellulose. Transactions of the ASAE.* Vol 44(6): 1707-1712). Freeze drying is not an economically feasible drying operation for large volumes of expanded cell wall products.

The fiber products of the invention may be rehydrated or partially rehydrated so that the highly refined cellulose product is rehydrated to a level of less than 90 g $H_2O$/g fiber mass, 70 g $H_2O$/g fiber mass, 50 g $H_2O$/g fiber mass or rehydrated to a level of less than 30 g $H_2O$/g fiber mass or less than 20 g $H_2O$/g fiber mass. This rehydration process adjusts the functionalities of the product within a target range of at least one property selected from the group consisting of water holding capacity, oil holding capacity, and viscosity and may include the use of a high shear mixer to rapidly disperse organic fiber plant mass materials in a solution. Also the method may include rehydration with soaking of the dry materials in a solution with or without gentle agitation.

Preferred areas of use include a bakery product to which at least 1% by weight of the organic fiber product of the invention is present in the bakery product. The process may enhance the stability of a bakery product by adding at least 1% by weight of the product of claim to the bakery product, usually in a range of from 1% to 10% by weight of the organic fiber plant mass product to the bakery product prior to baking and then baking the bakery product. This process may include increasing the storage stability of a flour-based bakery product comprising adding from 1% to 10% by weight of the highly refined organic fiber plant mass product 1 to the bakery product prior to baking and then baking the bakery product.

The basic process of the invention may be generally described as providing novel and improved fiber waste by-product from citrus fruit pulp (not the wood and stem and leaves of the trees or plant, but from the fruit, both pulp and skin) or fiber from sugar beet, tomatoes, chicory, potatoes, pineapple, apple, cranberries, grapes, carrots and the like (also exclusive of the stems, and leaves). The provided fiber mass is then optionally soaked in water or aqueous solution (preferably in the absence of sufficient metal or metallic hydroxides e.g., KOH, CaOH, LiOH and NaOH) as would raised the pH to above 9.5, preferably in the complete absence of such hydroxides (definitely less than 3.0%, less than 1.0%, more often less than 0.9%, less than 0.7%, less than 0.5%, less than 0.3%, less than 0.1%). The soaked material is then drained and optionally washed with water. This is optionally followed by a bleaching step (any bleaching agent may be used, but mild bleaching agents that will not destroy the entire physical structure of the fiber material is to be used (with hydrogen peroxide a preferred example, as well as mild chlorine bleaches). It has also been found that the bleach step is optional, but that some products require less color content and require bleaching. The (optionally) bleached material is washed and filtered before optionally being subjected to a shredding machine, such as a plate refiner which shreds the material into micro fibers. The optionally soaked, bleached, and refined material is then optionally dispersed, and homogenized at high pressure to produce HRC gel.

The HRC dispersion of the present invention is a highly viscous, semi-translucent gel. HRC embodiments comprise dried powders that are redispersable in water to form gel-like solutions. The functional characteristics of HRC are related to various properties, including water- and oil-retention capacity, average pore size, and surface area. These properties inherently relate to absorption characteristics, but the properties and benefits provided by the processes and products of the invention seem to relate to additional properties created in the practice of the invention.

The present invention also includes an aqueous HRC gel having a lignin concentration of about one to twenty percent (1 to 20%). The HRC products of the present invention exhibit a surprisingly high WRC in the range of about 20 to at least about 56 g $H_2O$/g dry HRC. This high WRC is at least as good as, and in some cases, better than the WRC of prior art products having lower or the same lignin concentrations. The HRC products exhibit some good properties for ORC (oil retention capacity). This same measure for WRC translates into a water holding capacity using standard method AACC 56-30 of >7 parts water per part of fiber, which approaches the range of a fiber having an expanded cell wall and high surface area. For the purpose of this patent application we are defining highly refined cellulose fibers as those with a total dietary fiber (TDF) content greater than 30% as measured by AOAC 991.43 and a water holding capacity (WHC) greater than five parts water per part fiber as measured by AACC 56-30 followed literally or with the following modifications; namely, 1) using shearing to hydrate the fiber mass, and/or 2) only using the first stage steps (1-4) of AACC 56-30 to find the approximate WHC and using this as the final WHC value, and/or 3) determining the final or approximate WHC value at 2-10% solids instead of 10% or using 2.5 g of fiber mass for the sample size instead of 5 g as the procedure calls for.

A general starting point for a process according to the invention is to start with raw material of sufficiently small size to be processed in the initial apparatus (e.g., where soaking or washing is effected), such as a soaker or vat. The by-product may be provided directly as a result of prior processing (e.g., juice removal, sugar removal, betaine removal, or other processing that results in the fiber by-product. The process of the present invention may also begin when raw material is reduced in size (e.g., chopped, shredded, pulverized) into pieces less than or equal to about 10×5 cm or 5 cm×2 cm. Any conventional type of manual or automated size reduction apparatus (such as chopper, shredder, cutter, slicer, etc.) can be used, such as a knife or a larger commercially-sized chopper. The resulting sized raw material is then washed and drained, thus removing dirt and unwanted foreign materials. The washed and chopped raw material is then soaked. The bath is kept at a temperature of about 20 to 100° C. The temperature is maintained within this range in order to soften the material. In one embodiment, about 100 g of chopped raw material is soaked in a 2.5 liter bath within a temperature range of about 20 to 80 degrees Centigrade for 10 to 90 minutes.

The resulting soaked raw material is subjected to another washing and draining. This washing and additional washing and draining tend to be more meaningful for sugar beets, potatoes, carrots (and to some degree also tomatoes, chicory, apple, pineapple, cranberries, grapes, and the like) than for citrus material. This is because sugar beets, potatoes, carrots, growing on the ground rather than being supported in bushes and trees as are citrus products, tend to pick up more materials from the soil in which they grow. Sugar beets and carrots tend to have more persistent coloring materials (dyes, pigments, minerals, oxalates, etc.) and retained flavor that also are often desired to be removed depending upon their ultimate use. In one embodiment, the soaked raw material is washed with tap water. In one other embodiment, the material is drained. This is optionally followed by bleaching the material with hydrogen peroxide at concentrations of about one (1) to 20% (dry basis) peroxide. The bleaching step is not functionally necessary to effect the citrus and grape fiber conversion to highly refined cellulose. With respect to carrots and sugar beets, some chemical processing may be desirable, although this processing may be significantly less stressful on the fiber than the bleaching used on corn-based HRC products. From our experience, some chemical step is required for sugar beets, and bleaching is one option. Using alkaline pretreatment baths is another option. Acid treatment or another bleaching agent are other options.

The material is optionally bleached at about 20 to 100° C. for about five (5) to 200 min. The bleached material is then subjected to washing with water, followed by filtering with a screen. The screen can be any suitable size. In one embodiment, the screen has a mesh size of about 30 to 200 microns.

The filtered material containing solids can then be refined (e.g., in a plate refiner, stone mill, hammer mill, ball mill, or extruder.). In one embodiment, the filtered material entering the refiner (e.g., a plate refiner) contains about four percent (4%) solids. In another embodiment, the refining can take place in the absence of water being added. The plate refiner effectively shreds the particles to create microfibers. The plate refiner, which is also called a disk mill, comprises a main body with two ridged steel plates for grinding materials. One plate, a refining plate, is rotated while a second plate remains stationary. The plates define grooves that aid in grinding. One plate refiner is manufactured by Sprout Waldron of Muncy, Pa. and is Model 12-ICP. This plate refiner has a 60 horsepower motor that operates at 1775 rpm.

Water may be fed into the refiner to assist in keeping the solids flowing without plugging. Water assists in preventing the refiner's plates from overheating, which causes materials in the refiner to burn. (This is a concern regardless of the type of grinding or shearing device used.). The distance between the plates is adjustable on the refiner. To set refining plate distances, a numbered dial was affixed to the refining plate adjustment handle. The distance between the plates was measured with a micrometer, and the corresponding number on the dial was recorded. Several plate distances were evaluated and the setting number was recorded. A variety of flow consistencies were used in the refiner, which was adjusted by varying solids feed rate. The amount of water flowing through the refiner remained constant. Samples were sent through the refiner multiple times. In one embodiment the materials are passed one or more times through the plate refiner.

The microfibers may then be separated with a centrifuge to produce refined materials. The refined materials are then diluted in water until the solids content is about 0.5 to 37%. This material is then dispersed. In one embodiment, dispersing continues until a substantially uniform suspension is obtained, about 2 to 10 minutes. The uniform suspension reduces the likelihood of plugging.

The resulting dispersed refined materials, i.e., microparticles, may then be homogenized in any known high pressure homogenizer operating at a suitable pressure. In one embodiment, pressures greater than about 5,000 psi are used. The resulting highly refined cellulose (HRC) gel may display a lignin content of about 1 to 20% by weight, depending in part upon its original content.

The absence of use of a mild NaOH soaking before the refining step in the present invention prior to high pressure homogenization does not require the use of high temperature and high pressure cooking (high temperature means a temperature above 100 degrees C. and high pressure means a pressure above 14 psi absolute). High temperature and high pressure cooking may be used, but to the disadvantage of both economics and output of the product. This novel process further avoids the need for either mild concentrations of NaOH or of highly concentrated NaOH and the associated undesirable environmental impact of discharging waste water containing any amount of NaOH and organic compounds. The process also avoids a need for an extensive recovery system. In one embodiment, the pH of the discharge stream in the present invention is only about 8 to 9 and may even approach 7. The method of the present invention has the further advantage of reducing water usage significantly over prior art processes, using only about one third to one-half the amount of water as is used in conventional processes to produce to produce HRC gel and amounts even less than that used in the Chen processes All of the mechanical operations, refining, centrifuging, dispersing, and homogenizing could be viewed as optional, especially in the case of citrus pulp or other tree bearing fruit pulps. Additionally, other shearing operations can be used, such as an extruder, stone mill, ball mill, hammer mill, etc. For citrus pulp, the only processes that are needed to produce the expanded cell structure are to dry (using the novel drying process) and then properly hydrate the raw material prior to the expanding and shearing step of the process of the invention. This simple process could also be used in other raw material sources.

Hydration is a term that means reconstituting the dried fiber back to a hydrated state so that it has functionality similar to the pre-dried material. Hydration can be obtained using various means. For instance, hydration can occur instantly by placing the dry products in a solution followed by shearing the mixture. Examples of shearing devices are a high shear disperser, homogenizer, blender, ball mill, extruder, or stone mill. Another means to hydrate the dry materials is to put the dry product in a solution and mix the materials for a period of time using gentle or minimal agitation. Hydrating dry materials prior to use in a recipe can also be conducted on other insoluble fibrous materials to enhance their functionality.

The initial slurry of fibers/cells from the EPM products is difficult to dry. There is even disclosure in the art (e.g., U.S. Pat. No. 4,413,017 and U.S. Pat. No. 4,232,049) that slurries of such processed products cannot be easily dried without expensive and time consuming processes (such as freeze drying, extended flat bed drying, and the like). Freeze drying is effective, but is not economically and/or commercially desirable. Similarly, tray dryers may be used, but the length of time, labor and energy requirements make the process costly. The slurries of the citrus and/or beet by-products may be dried economically and effectively according to the following practices of the invention. Any type of convective drying method can be used, including a flash dryer, fluid bed dryer, spray dryer, etc. One example of a dryer that can be used is a fluid bed dryer, with dry material being added to the slurry to equilibrate the moisture content in the materials. It has been found that by adding 5:1 to 1:1 dry to wet materials within the fluid bed drier improves the air flow within the drier and the material may be effectively dried. In the absence of the combination of "dry" and "wet" materials, the slurry will tend to merely allow air to bubble through the mass, without effective drying and without a true fluid bed flow in the drier. The terms wet and dry are, of course, somewhat relative, but can be generally regarded as wet having at least (>40% water/<60% solid content] and dry material having less than 20% water/ 80% solid content). The amounts are not as critical as the impact that the proportional amounts of materials and their respective water contents have in enabling fluid flow within the fluid bed drier. These ranges are estimates. It is always possible to use "wet" material with lower moisture content, but that would have to have been obtained by an earlier drying or other water removal process. For purpose of economy, and not for enabling manufacture of HRC microfibers according to the present invention from citrus or beet by-product, it is more economical to use higher moisture content fiber mass as the wet material. After the mixture of wet and dry materials have been fluid bed dried (which can be done with air at a more moderate temperature than is needed with flat bed dryers (e.g., room temperature air with low RH may be used, as well as might heated air). A flash drier may also be used alternatively or in combination with a fluid bed drier to effect moisture reduction from the citrus or beet by-product prior to produce a functional dry product. It would be necessary, of course, to control the dwell time in the flash drier to effect the appropriate amount of moisture reduction and prevent burning. These steps may be provided by the primary or source manufacturer, or the product may be provided to an intermediate consumer who will perform this drying step to the specification of the process that is intended at that stage.

One aspect of the drying process is useful for the drying of any expanded cellulose products, especially for the drying of highly refined cellulose fibers and particles that have been extremely difficult or expensive to dry. Those products have been successfully dried primarily only with freeze drying as a commercially viable process. That process is expensive and energy intense. A method according to the present invention for the drying of any expanded cellulose fiber or particle product comprises drying an expanded cellulose product by providing a first mass of expanded cellulose fiber product having a first moisture content as a weight of water per weight of fiber solids; providing a second mass of expanded cellulose fiber product having a second moisture content as a weight of water per weight of fiber solids, the second moisture content being at least 20% less than said first moisture content; combining said first mass of expanded cellulose fiber product and said second mass of expanded cellulose product to form a combined mass; drying said combined mass in a drying environment to form a dried combined mass. The method may have the dried combined mass dried to a moisture content of less than 20, less than 10, less than 8, less than 5 or less than 3 $H_2O$/g fiber mass. The method, by way of non-limiting examples, may use drying environments selected from the group consisting of, flash driers, fluid bed driers and combinations thereof.

The rehydration and shearing (particularly high shearing at levels of at least 10,000 $sec^{-1}$, preferably at least 15,000 $sec^{-1}$, more often, greater than 20,000, greater than 30,000, greater than 40,000, and conveniently more than 50,000 $sec^{-1}$ (which is the actual shearing rate used in some of the examples) of the dry fiber product enables the resultant sheared fiber to retain more moisture and to retain moisture more strongly. It has been noted in the use of materials according to the practice of the invention that when the fiber products of the invention are rehydrated, the water activity level of rehydrated fiber is reduced in the fiber (and the fiber present in a further composition) as compared to free water that would be added to the further composition, such as a food product. The food products that result from cooking with 0.1 to 50% by weight of the HRC fiber product of the invention present has been found to be highly acceptable to sensory (crust character, flavor/aroma, grain/texture, taste, odor, and freshness, especially for mixes, frozen foods, baked products, meat products and most particularly for bakery goods, bakery products, and meat products) tests on the products. Importantly, the products maintain their taste and mouth feel qualities longer because of the higher moisture retention. The high water absorbency and well dispersed nature of the product also lends itself to be an efficient thickening agent/suspending agent in paints, salad dressings, processed cheeses, sauces, dairy products, meat products, and other food products.

Donuts, breads, pastry and other flour products that are deemed freshest when they are moist, tend to retain the moisture and their sensory characteristics compatible with freshness longer with the inclusion of these fibers. In bakery products, the loaf volume maintains the same with the addition of the product of the present invention.

In another embodiment, the HRC products of the present invention possess a WRC and ORC that are at least as good as or even better than prior art products (including the Chen product) with regard to the water retention characteristics and the strength of that retention. This is true even though the products of the present invention may have a higher lignin concentration than products made using conventional processes and are dried (and the same amount as the Lundberg patents products). It is assumed that the lignin which is present has been substantially inactivated to a sufficient degree so that the undesirable clumping does not subsequently occur. Another reason for these improved properties may be due to a porous network structure that is present in the HRC products of the present invention, but is lost in prior art products due to high concentration soaking in NaOH, and which may be slightly reduced even with the mild NaOH solutions used by the Lundberg Patents.

A number of unexpected properties and benefits have been provided by the highly refined cellulose microfiber product of the present invention derived from parenchymal cell material. These products are sometimes referred to herein as "exclusively parenchymal cell wall structures." This is indicative of the fact that the majority source of the material comes from the cell structures of the plants that are parenchymal cells. As noted earlier, the HRC microfibers of the invention are not produced by mild treatment of the leaves, stems, etc. of the plants (which are not only parenchymal cell wall structures, but have much more substantial cell structures). This does not mean that any source of citrus or beet cells and fibers used in the practice of the present invention must be purified to provide only the parenchymal cells. The relative presence of the more substantive cells from leaves and stems will cause approximately that relative proportion of cell or fiber material to remain as less effective material or even material that is not converted to HRC, but will act more in the nature of fill for the improved HRC microfibers of the present invention. It may be desirable in some circumstances to allow significant portions of the more substantive cells and fibers to remain or even to blend the HRC (citrus or beet parenchyma based) product of the present invention with HRC fibers of the prior art to obtain particularly desired properties intermediate those of the present invention and those of the prior art. In the primary manufacturing process of the invention (that is, the process wherein the cells that have essentially only parenchymal cell walls are converted to HRC microfibers or particles according to the mild treatment process of the present invention), the more substantive cells and fibers may be present in weight proportions of up to fifty percent (50%). It is preferred that lower concentrations of the more substantive fibers are present so as to better obtain the benefit of the properties of the HRC fibers of the present invention, so that proportions of cells having exclusively parenchymal cell walls in the batch or flow stream entering the refining process stream constitute at least 50%, at least 60%, at least 70%, at least 80%, at least 90%, at least 95%, at least 97%, at least 98%, at least 99% or preferable about 100% of the fibrous or cellular material added to the refining flow stream. The final fiber product should also contain approximately like proportions of the HRC product of the present invention with regard to other HRC additives or fiber additives.

Among the unexpected properties and benefits of the HRC materials of the present invention derived from the mild refinement of cells and fiber from citrus and beet by-product are the fact of the HRC fibers, the stability of HRC fibers from parenchymal cells, the high water retention properties, the strength of the water retention properties of the fibers, the ability of the HRC fibers to retain water (moisture) even when heated, the ability of the HRC fibers to retain water (moisture) on storage, and the ability of the HRC fibers to retain moisture in food stuff without promoting degradation, deterioration or spoilage of the food as compared to food stuff with similar concentrations of moisture present in the product that is not bound by HRC fibers. The ability of the fiber materials of the present invention to retard moisture migration is also part of the benefit. This retarded water migration and water activity of water retained or absorbed by the fibers of the invention may be related to the previously discussed binding activity and binding strength of water by the fiber. As the moisture is retained away from other ingredients that are more subject to moisture-based deterioration, the materials of the invention provide significant benefits in this regard. These benefits can be particularly seen in food products (including baked goods such as breads, pastries, bars, loaves, cakes, cookies, pies, fillings, casseroles, protein salads (e.g., tuna salads, chicken salads), cereals, crackers, meats, processed dairy products, processed cheese, entrees and the like) that are stored as finished products either frozen, refrigerated, cooked, or at room temperature in packaging. The HRC fiber of the present invention may be provided as part of a package mix that can be used by the consumer, with the HRC fibers remaining in the final product to provide the benefits of the invention in the product finished (baked or cooked) by the consumer. The HRC fiber materials of the present invention provide other physical property modifying capabilities in the practice of the invention. For example, the fibers can provide thickening properties, assist in suspending or dispersing other materials within a composition, and the like. These properties are especially present in HRC fibers of the invention provided from sugar beets.

The percentage of fiber in the final product that is desirable to provide identifiable benefits is as low as 0.01% or 0.05% or 0.1% of the total dry weight of the final product. The HRC fiber product of the invention may be used as from 0.05 to 50% by weight of the dry weight of the product, 0.5 to 40%, 1 to 40%, 1 to 30%, 1 to 25%, 1 to 20%, 1 to 15%, 1 to 10%, and 2 to 20% by weight of the dry weight of the final product.

An unexpected property is for the finished dried product to have a viscosity in a 1% solution of 1000-300,000 centipoise at 0.5 rpms when measured using a Brookfield LVDV++ viscometer (Middleboro, Mass.). An additional unexpected property is for the end processed product to have similar rheology curves as other common hydrocolloids, such as xanthan gum. The expanded fiber products of the invention are highly effective and environmentally safe viscosity enhancers. In addition, they are quite useful in edible products, in addition to the functional benefits they add to edible products such as beverages, cheeses, baked goods, liquid and semi-liquid products (stews, soups, etc.).

Various additives and ingredients may be added to the product for design purposes, such as water soluble hemicellulose, derived from oil seeds and cereals, as described in EP-A-0 521 707 as a food additive for acidic and non-acidic protein products and for baked products. Its main sugar constituents are rhamnose, fucose, arabinose, xylose, galactose, glucose and uronic acid and it has an average molecular weight from 50,000 to 1,000,000, preferably from 100,000 to 400,000 and can be obtained by degradation of water-insoluble vegetable fibres containing protein in acid conditions preferably around the isoelectric point of the protein and at a temperature of 100 to 130.degree. C. The process for preparation of the hemicellulose described in the above-cited document is incorporated herein by reference. A water soluble hemicellulose of soya, particularly derived from soybean cotyledons mainly containing dietetic fibres of soya (about 60-70% by weight) is described in EP-A-0 598 920 (incorporated herein by reference) as an emulsifier. A commercial product is available from Fuji Oil Company under the commercial name SOYAFIBE™. Pectins having a high degree of esterification or HM pectin may be utilized herein are chemically defined as polygalacturonic acids the carboxylic groups of which are esterified with methyl alcohol in amounts greater than 50% and preferable greater than 70%. Of particular interest are depolymerised HM pectins obtained from citrus fruits and apples having emulsifying properties, such as described in FR-A-2 745 980; such pectins have a molecular weight less than 80,000 dalton and preferably between 10,000 and 50,000 dalton. The compositions can optionally comprise, in combination with the above mentioned ingredients, pectins having a high degree of esterification with a molecular weight greater than 150,000 dalton. Such pectins, which typically have thickening/stabilising properties, can be utilised in combination with hemicellulose preferably in a ratio by weight of 1:1 to 1:1.5 with respect to the hemicellulose. The product according to the invention preferably has an alimentary fat content between 0 or 5 and 30%, 25, 20, 15, 10, or 5% by weight referred to the weight of the emulsion, more preferably a content of from 10 to 18% or 8-12%, or 5-8% depending upon the dietary market desired by weight which is the typical content of alimentary fats in the products defined as ices or properly as ice-cream. The fat phase of the emulsion can be constituted either by butyric fats or by a mixture of butyric fats and vegetable fats. The introduction of butyric fats is preferably obtained by the use of whole milk and milk cream respectively in the region of 20 to 45% by weight and from 15 to 40% by weight referred to the weight of the emulsion. However, the desired proportion of butyric fats could be obtained also by using cow's milk butter. The whole milk constitutes an important element of the emulsion in that it acts both as a solvent for dissolving the dry parts and as a basic element for the state change. Moreover the milk which constitutes the continuous phase of the emulsion, which as mentioned is preferably of the oil-in-water type, contributes to the supply of proteins and lactose present in the emulsion; also the milk cream contributes to the fat phase, and to the protein and the lactose content, integrates the aqueous phase and moreover acts as a flavor contributing element. Naturally, the proportion of fats in the emulsion will have to be regulated by means of the addition of water to the emulsion itself. In the case of the use of vegetable fats, these are preferably chosen from oils having a melting point from 30 to 36° C. such as, for example, cocoa oil, palm oil and palm-kernel oil. Among these the use of fractionated cocoa oil, or rather the high melting fraction of the cocoa oil is preferred mainly due to its organoleptic characteristics. In this case the ratio by weight between butyric fats and vegetable fats is preferably maintained at a value from 1:1 to 2:1. The protein content is preferably between 1 and 8% by weight referred to the weight of the emulsion, preferably between 1 and 5% by weight.

As well as lactose in the emulsion there is also generally present a suitable added sugar as a sweetener, preferably chosen from saccharose and/or fructose or artificial sweeteners. The use of fructose is particularly advantageous in that thanks to its low molecular weight it gives rise to a lowering of the freezing temperature of the emulsion. The desired proportion of sugar can be obtained also by means of the use of condensed milk, which contributes likewise to the protein content in the emulsion. The total quantity of sugars can be obviously chosen in such a way as to achieve the desired degree of sweetness, but typically is up to about 32% with respect to the weight of the emulsion; in the case of the use of fructose its quantity is generally in the region of from 3 to 10% referred to the weight of the emulsion.

Water soluble hemicellulose or HM pectin are typically used in quantities of from 0.05 to 3% by weight of the weight of the total emulsion, preferably from 0.1 to 0.3% by weight. The salt acting as protein stabilizer is preferably a disodium or dipotassium phosphate and is preferably used in quantities from 0.005 to 0.3% by weight, preferably from 0.01 to 0.02% by weight referred to the weight of the emulsion.

The chemically modified starch may be, by way of non-limiting examples, be chosen from acetate starch preferably of the adipic cross linked type (starch n. 14) and di-starch phosphate preferably hydroxypropylate di-starch phosphate and is used in quantities of from 0.1 to 1.5% by weight referred to the weight of the emulsion.

With reference to 100 parts of modified starch, there are preferably present in the thickening/stabilizing composition from 0.6 to 20 parts by weight of gellification-retarding salts and from 6 to 300 parts of water soluble hemicellulose or HM pectin.

The flavoring liquids and/or solids are used in quantities sufficient to impart the desired flavor; the flavorings can be introduced into the emulsion in solution in alcohol solvents used in the minimum quantities necessary to maintain the flavoring agent in solution.

Examples of Ice Cream-type product compositions are shown in the Tables below:

| INGREDIENTS | wt % | DRY SOLIDS |
|---|---|---|
| Milk/Cream Mixture | 75.68 | 20.00 |
| Sugar | 16.00 | 16.00 |
| Condensed Milk | 6.00 | 4.70 |
| Skimmed Milk Powder | 1.00 | 1.00 |
| Modified Starch No. 14 | 1.00 | 1.00 |
| Water Soluble Hemicellulose (Soyafibe S DA100) | 0.08 | 0.08 |
| HM Pectine | 0.15 | 0.15 |
| Flavorings | 0.05 | 0.05 |
| Diosodium Phosphate Salt (Na$_2$HPO$_4$) | 0.04 | 0.04 |
| Total | 100.00 | 43.02 |

| INGREDIENTS | wt % | THEORETICAL DRY SOLIDS |
|---|---|---|
| Liquid Coffee | 45.03 | 2.00 |
| Sugar | 25.00 | 25.00 |
| Milk/Cream Mixture | 15.10 | 3.80 |
| Vegetable Fat | 10.00 | 10.00 |
| Milk Proteins | 3.50 | 3.50 |
| Modified Starch No. 14 | 1.00 | 1.00 |
| Water Soluble Hemicellulose (Soyfibe S DA100) | 0.13 | 0.13 |
| HM Pectin | 0.20 | 0.20 |
| Dusodium Phosphate salt (Na$_2$HPO$_4$) | 0.05 | 0.05 |
| Total | 100.00 | 45.68 |

| INGREDIENTS | wt % | THEORETICAL DRY SOLIDS |
|---|---|---|
| Liquid Coffee | 45.20 | 2.00 |
| Sugar | 25.00 | 25.00 |
| Milk/Cream Mixture | 15.15 | 3.80 |
| Vegetable Fat | 10.00 | 10.00 |
| Milk Protein | 3.50 | 3.50 |
| Modified Starch No. 14 | 1.00 | 1.00 |
| Water Soluble Hemicellulose (Soyafibe S DA100) | 0.10 | 0.10 |
| Disodium Phosphate Salt (NA$_2$HPO$_4$) | 0.05 | 0.05 |
| Total | 100.00 | 45.45 |

Generally, ice creams are classified into ice creams and sherbet, and ice creams are further classified into an ice cream, ice milk and lacto-ice according to the contents of milk fat and non-fat milk solids. Ice creams are generally produced by freezing a pasteurized ice cream mix containing 3 to 20% of milk fat, vegetable fat and oil or a mixture thereof, 3 to 12% of non-fat milk solids, 8 to 20% of sugar, and if necessary, a small amount of a stabilizer, an emulsifier, a color, flavors and the like, by incorporating air into a continuous freezer to give an overrun of 10 to 150%, filling a container with the resultant mixture, and then hardening it. Solid fruit, candies, nuts and other additives may be added as from about 0.1 to 15% by weight of the ice cream or sherbet. Various U.S. Patents such as U.S. Pat. Nos. 5,403,611; 5,680,769; 4,853,243; 6,558,729; 3,993,793; 4,333,953; 4,552,773 and the like describe ice cream, ice milk, sherbet, yogurt, and other dairy products, processes of manufacture, and apparatus for their manufacture and are incorporated herein by reference.

In the cheese manufacturing aspect of this technology, the system and additives can be used in, for example, yogurt, cottage cheese, process cheese, and natural cheeses such as, for example, cottage cheese, process cheese, cream cheese, yogurt, and natural cheeses such as, for example, Cheddar cheese, Colby cheese, Monterey Jack, Havarti cheese, Muenster cheese, Brick cheese, Gouda cheese, Mozzarella cheese, and mixtures thereof. In one method, where additives, ingredients, fortifiers, vitamins, minerals and the like may be added, a natural cheeses employed may be derived from the treatment of any dairy liquid that provides cheese curds upon renneting. Such liquids include whole milk, reduced fat milk, skim milk, and any such milk further containing added dairy fractions. Such dairy fractions may be chosen, by way of nonlimiting example, from cream fractions, concentrated milk fractions obtained for example by evaporation, diafiltration and/or ultrafiltration of milk, and comparably treated dairy liquids. The dairy liquid employed in the cheese making fermentation may further contain dried solid components of milk fractions, such as non fat dry milk, cream solids, and the like.

The dairy liquid so provided is subjected to a conventional cheese making process. The cheese may be produced by treatment with a rennet, a cheesemaking culture, or a combination thereof. When a cheesemaking culture is employed, the identity of the resulting cheese, and its characteristic flavor, texture and mouthfeel are governed by the particular culture chosen for the fermentation. In this way, a broad range of natural cheeses may be produced for use in the present invention. These cheeses include, by way of nonlimiting example, Cheddar cheese, Colby cheese, Monterey Jack, Havarti cheese, Muenster cheese, Brick cheese, Gouda cheese, Mozzarella cheese, and the like. Mixtures of such cheeses may also be used.

The desired natural cheese is fragmented or shredded to pieces whose sizes are appropriate for receiving the calcium supplement. The pieces should also be appropriate in size for subsequent compaction to form a cake of calcium-fortified cheese that may be packaged for sale. In general, cheese fragments used may be regular or irregular sized particles. For shredded pieces, the particles are preferably about $\frac{1}{32}$ to about $\frac{5}{8}$ inches in diameter and about 1 to about 5 inches in length; more preferably, they are about $\frac{1}{16}$ inch in diameter and about 2 to 3 inches in length. For more circular pieces, the particles are preferably about $\frac{1}{2}$ to about 1 inch in diameter; more preferably, they are about $\frac{3}{4}$ inch in diameter. Of course, other shaped particles having similar dimensions to those just discussed can be used. Such cheese particles or fragments generally weigh from about $\frac{1}{50}$th of an ounce to about 1-2 ounces. The size of the fragments is appropriate to receive any additives, such as a calcium supplement if, after adding the calcium supplement, the mixture may be blended to distribute the calcium supplement essentially uniformly throughout the blended mixture. If desired, other nutritional supplements can be added separately or at the same time as the calcium supplement.

A composition comprising the supplement may be added to the shredded or fragmented cheese. The composition may be a solid blend of the calcium sulfate and tricalcium phosphate, or it may be a suspension or solution of the compounds in a liquid. The liquid may be an aqueous composition or an organic liquid such as a fat or oil (and especially the oil and/or fat reduced materials described herein), or a volatile edible solvent such as ethanol. As noted above, the cheeses of this invention may contain, in addition to the calcium supplement, other nutritional supplements such as, for example, vitamins, minerals, antioxidants, probiotics, botanicals, and mixtures thereof.

The amount of the calcium supplement added can, of course, vary considerably depending on the targeted consumer and their recommended daily requirement. Generally, the amount of calcium supplement added is in an amount sufficient to provide at least an additional 10 of the United States Recommend Daily Intake (USRDI) per single serving size. Thus, the amount of added calcium supplement will depend on, for example, the targeted consumer, the particular dairy or cheese product, and the single serving size. For example, Cheddar cheese normally contains about 200 mg calcium per 30 gram serving size, which corresponds to about 20 percent of the USRDI for an adult; thus, to obtain an additional 10 percent USRDI, sufficient calcium supplement would be added to provide an additional 100 mg calcium per serving size. Of course, higher levels of calcium could be added if desired. Since both calcium sulfate and tricalcium phosphate contain relatively high levels of calcium, these desired calcium levels can be obtained using relatively low levels of the calcium compounds. Preferably, the calcium supplement is added at a level such that a single serving size of the calcium-fortified cheese product will provide at least about 10 percent additional calcium (i.e., in addition to the calcium normally present in the product) of the recommended daily calcium requirement (currently about 1000 mg calcium for an adult) per serving size. As those skilled in the art will realize, lower or higher amounts can also be used taking into account the nutritional requirements of consumers.

Low Protein Imitation Cheese

Imitation cheese that is also low in protein is now available from several sources. These cheeses are suitable for the PKU diet and for other amino-acid restricted diets used in treatment of metabolic disorders. Information about the cheeses is given below. Whitehall Cheese Co., Schreiber Co. and Rella Good Cheese Co. Dietary Specialties also now carries an imitation low protein cheese with their label, sold through mail-order in the U.S. only (American Style Singles Imitation Cheese, and Shredded Mozzarella & Cheddar cheese mixed in a package): to order, call 1-888-MENU123. Nutrient information, including phenylalanine content, is on the label.

Special Note: Melting of Imitation Cheeses:

All of the low protein imitation cheeses are non-melting. They will soften with considerable heating, but due to the ingredients (mainly starch and oil), it is not possible for the cheese to melt like normal high protein cheese. It is the protein component of normal cheese that allows it to melt. If you add shredded cheese to a liquid for a sauce, you might have better "melting." The addition of the HRC materials might somewhat modify this property as desired.

Examples of commercially available imitation cheeses to which manufacturing processes or final products the HRC may be added, include Ener-G Foods Imitation Cheeses; Whitehall Specialties Cheese Co.; Schreiber Co. Low Protein Imitation Cheese; Vegan Rella Cheese; Cheeses with protein content higher than one gram per serving; and Cheese Sightings (Both Whitehall and Schreiber manufacturers)

Ener-G Foods Imitation Cheeses from Ener-G Foods in Seattle, Wash. distributes cheddar and mozzarella cheeses in 2 lb. blocks. The cheese is shelf-stable (5 year shelf-life). It does not melt. The manufacturer is the Whitehall Cheese Co. Ener-G Foods has distributed this cheese since 1997 to US residents.

Nutrient Content
Mozzarella, 1 oz (28 gm):
Phenylalanine (mg) 33
Protein (gm) 0.6 gm
Calories (Kcal) 78
Cheddar, 1 oz. (28 gm):
Phenylalanine (mg) 45 phe
Protein (gm) 0.6 protein
Calories (Kcal) 78
For Distribution Outside of the US
Canada: Contact Liv-n-Well at tel: 604-270-8474 or e-mail: zeno@direct.ca
UK/Ireland: contact David Green, General Dietary, Ltd., tel: 0181-336-2323 or e-mail: 106221.2663@compuserv.com
Other countries: Please inquire at 1-206-767-6660 or fax: 206-764-3398, or e-mail samiii@ener-g.com.

Other cheese making processes, including soft, imitation and semi-soft cheeses, parmesan, mozzarella, and specialty cheeses are taught in U.S. Pat. Nos. 6,177,118; 5,902,625; 5,925,398; 6,096,352; 5,846,579; 5,952,022; 5,656,320 and the like are incorporated herein by reference and may be used with the materials and processes described herein. Although this invention applies to using expanded cell wall materials in dairy products, it also applies to imitation dairy products as well, such as imitation cheeses, creamers, ice cream, sauces, and spreads, etc.

EXAMPLE 1

A reduced fat shortening which could be added to dairy-based products was made by adding Citri-Fi™ 200 FG citrus fiber coprocessed with guar gum from Fiberstar, Inc., water, and vegetable shortening. The water level used was both three and six times the weight of Citri-Fi™ and one half of the shortening was replaced with citrus fiber and water combination. Test 1 contained 100% vegetable shortening. Test 2 contained shortening at 50% and the balance being Citri-Fi™ 200 FG (citrus fiber, guar gum) and water at 6 times the weight of fiber. Test 3 contained shortening at 50% and the balance being Citri-Fi™ 200 FG (citrus fiber, guar gum) and water at 3 times the weight of fiber. All tests were conducted at 75 F with five replicates. The spreadability of the spreads were evaluated using a texture analyzer available from Texture Technologies with a spreadibility rig (TA-425 TTC) to measure the cohesive and adhesive forces of the spreads. The test results are shown in Table 1.

TABLE 1

Cohesive and adhesive forces as measured by a texture analyzer of a 100% vegetable shortening compared to 50% shortening and balance being Citri-Fi ™ 200 FG (citrus fiber, guar gum) and water at 6 times the fiber weight (Test 2) and 3 times the fiber weight (Test 3).

| Test Number | Cohesive force (g/mm) | Adhesive force (g/mm) |
| --- | --- | --- |
| Test 1 | 1555.89$^{A,b}$ | −1137.96$^a$ |
| Test 2 | 1353.1 $^a$ | −1061.1 $^a$ |
| Test 3 | 1736.2 $^b$ | −1428.49$^b$ |

$^{A \& B}$ Denote groupings that are not statistically different from each other.

The spreadability results from Table 1 show that a 50% shortening spread can be made with very similar spreadability to a 100% shortening product. And the adhesive and cohesive forces can be adjusted depending on the amount of water used along with the citrus fiber. In this example, if water is used at three times the weight of the citrus fiber, guar gum, then the spread had more adhesive and cohesive forces and was more firm. Whereas if water is used at six times the weight of the citrus fiber, guar gum, then the spread had less cohesive and adhesive forces and was slightly less firm.

EXAMPLE 2

Another test was conducted by adding Citri-Fi™ 200 FG (citrus fiber, guar gum), water, to a low trans roll-in, commonly used in the production of Danish, available from Bunge. Once again various water levels were used to evaluate the differences of water levels but another variable of the amount of roll-in replaced was also evaluated. The amount of roll-in replaced was 33% and 50%. Once again the cohesive and adhesive forces were measured using a texture analyzer. Test 4 contained the low trans roll in at 100%. Test 5 contained the low trans roll in at 66% and the remaining being fiber and water at six times its weight. Test 6 contained the low trans roll at 50% and the remaining being fiber and water at 3 times the weight of fiber. Test 7 contained low trans roll in 50% and the remaining being fiber and water at 6 times the weight of fiber. The test results are shown in Table 2.

TABLE 2

Cohesive and adhesive forces as measured by a texture analyzer of control low trans roll in and reduced fat low trans roll-in spread. Test 4 contained the low trans roll in at 100%. Test 5 contained the low trans roll in at 66% and the remaining being fiber and water at six times its weight. Test 6 contained the low trans roll at 50% and the remaining being fiber and water at 3 times the weight of fiber. Test 7 contained low trans roll in 50% and the remaining being fiber and water at 6 times the weight of fiber.

| Test Number | Cohesive force (g/mm) | Adhesive force (g/mm) |
| --- | --- | --- |
| Test 4 | 1295.88$^a$ | −1092.29$^a$ |
| Test 5 | 1357.79$^a$ | −1120.43$^a$ |
| Test 6 | 2135.99$^b$ | −1899.33$^b$ |
| Test 7 | 1803.58$^c$ | −1687.1 $^c$ |

Superscript groupings with common letters denote groupings that are not statistically different from each other.

The results from this testing suggests that with the low trans roll in product, using water at six times the weight of Citri-Fi™ 200 FG (citrus fiber, guar gum) was effective at making a product with similar cohesive and adhesive forces when doing a 33% roll-in replacement, however, at the higher replacement level of 50%, the roll-in was considerably more firm when water was used at either 6 or 3 times the weight of fiber. These results would indicate that to attain a similar spreadibility for this product, a higher water level could be used.

EXAMPLE 3

Another round of tests was conducted using a margarine roll in commonly used in the production of Danish. This time a straight water level of six times the weight of Citri-Fi™ 200 FG (citrus fiber, guar gum) was used and two levels of roll-in replacement were evaluated, namely, 50% and 33% replacement. The cohesive and adhesive forces were measured using the same texture analyzer and rigging as in examples one and two. Test 8 contained 100% margarine roll-in. Test 9 contained margarine roll-in at 66% and the balance being Citri-Fi™ 200 FG (citrus fiber, guar gum) and water at 6 times the weight of fiber. Test 10 contained margarine roll-in at 50% and the balance being Citri-Fi™ 200 FG (citrus fiber, guar gum) and water at 6 times the weight of fiber. The test results are shown in Table 3.

TABLE 3

Cohesive and adhesive forces as measured by a texture analyzer of control margarine roll in and reduced fat margarine roll-in spread. Test 8 contained 100% margarine roll-in. Test 9 contained margarine roll-in at 66% and the balance being Citri-Fi ™ 200 FG (citrus fiber, guar gum) and water at 6 times the weight of fiber. Test 10 contained margarine roll-in at 50% and the balance being Citri-Fi ™ 200 FG (citrus fiber, guar gum) and water at 6 times the weight of fiber.

| Test Number | Cohesive force (g/mm) | Adhesive force (g/mm) |
|---|---|---|
| Test 8 | 1433.12$^a$ | −1184.75$^a$ |
| Test 9 | 998.48$^b$ | −865.97$^b$ |
| Test 10 | 1084.98$^b$ | −986.34$^b$ |

The test results shown in Table 3 suggest that with this margarine roll-in, a water level of 6 times the weight of fiber may be higher than what is needed to make a reduced fat roll-in with equivalent spreadability compared the full fat control.

EXAMPLE 4

In Example 1 and in Example 2 we showed that the by adding water at three times the weight of the Citri-Fi™ 200 FG (citrus fiber, guar gum) can make the reduced fat spread more thick compared to the control spread. However, an alternative way to make a more cohesive and adhesive texture is to start with a fat that has a harder texture and to add the 6 times water and fiber to this starting mixture. In this example, a Swede Gold shortening was used along with Citri-Fi™ 200 FG (citrus fiber, guar gum) and water at 6 times the fiber weight. The texture of this combination was compared to the control roll-in as shown in Test 8. The spreadability of the spreads were evaluated using a texture analyzer available from Texture Technologies with a spreadability rig (TA-425 TTC) to measure the cohesive and adhesive forces of the spreads.

TABLE 4

Cohesive and adhesive forces as measured by a texture analyzer of control margarine roll in and reduced fat margarine roll-in spread. Test 8 contained 100% margarine roll-in. Test 11 contained a hard fat roll-in that was reduced by 50% with Citri-Fi ™ 200 FG (citrus fiber, guar gum) and water at 6 times the fiber weight.

| Test Number | Cohesive force (g/mm) | Adhesive force (g/mm) |
|---|---|---|
| Test 8 | 1433.12$^a$ | −1184.75$^a$ |
| Test 11 | 2159.61$^b$ | −1731.63$^b$ |

EXAMPLE 5

A control Danish made with 100% margarine roll-in was compared to a Danish made with a reduced fat roll-in that was prepared and compared to a 66% roll-in and balance being Citri-Fi™ 200 FG (citrus fiber and guar gum). The water level used was six times the weight of the fiber. Roll in is typically used in a Danish to produce the flaky and layered texture that is desired for a Danish or croissant. Thus, the test with the reduced fat roll in to see if the layered texture and flakyiness could be maintained when the roll-in had a percentage replaced with Citri-Fi™ 200 FG (citrus fiber and guar gum) and water. The following formula was used for the control and reduced fat Danish.

TABLE 5

Formula used in the production of a control and reduced fat roll-in Danish.

| Item Name | Control (lbs) | 50% Reduced Shortening |
|---|---|---|
| Danish Base | 100.00 | 100.00 |
| Eggs, Whole | 8.04 | 8.04 |
| Water | 34.29 | 34.29 |
| Yeast | 3.52 | 3.52 |
| Roll In | 8.71 | 5.81 |
| Water | 0.00 | 2.49 |
| Citri-Fi ™ 200 FG | 0.00 | 0.42 |

After baking, the eating qualities in terms of taste, texture, flakiness, of both the control and reduced fat Danish were noted to be near identical to each other, which suggests that the Citri-Fi™ 200 FG (citrus fiber and guar gum) and additional water in the reduced fat roll-in can maintain the integrity of the full fat roll-in to provide a layered and flaky texture.

EXAMPLE 6

Reduced Fat Cake

Citri-Fi™ 100 citrus fiber from Fiberstar, Inc. was used in testing a 50% reduced fat shortening cake formula. The amount of Citri-Fi™ 100 citrus fiber used was 0.125 times the weight of shortening removed from the formula and the amount of water was 7 times the weight of Citri-Fi™ 100 citrus fiber. The nutritional analysis for the control and test cake formula was generated using Genesis software from Esha Research (Salem, Oreg.). The cake was made according to the formula shown in Table 1:

| Ingredient | Control formula | Reduced shortening |
|---|---|---|
| Step 1 | | |
| granulated sugar | 110.1 | 110.1 |
| cake shortening | 52.9 | 26.5 |
| Citri-Fi ™ 100 | 0 | 5.3 |
| water | 0 | 15.9 |
| Step 2 | | |
| cake flour | 100 | 100 |
| non fat dry milk | 10.1 | 10.1 |
| baking powder | 7.6 | 7.6 |
| soda | 0.7 | 0.7 |
| salt | 3.7 | 3.7 |
| pre-gel wheat starch | 4.9 | 4.9 |
| Step 3 | | |
| water | 70 | 70 |
| Step 4 | | |
| whole eggs | 89.9 | 89.9 |
| vanilla flavor | 2.5 | 2.5 |
| water | 19.9 | 19.9 |
| TOTAL | 472.3 | 467.1 |

Here is the mixing and baking procedure for the cakes.
1. Combine fiber, water, shortening, and sugar in the mixing bowl, and mix on low for 2 minutes with a flat paddle.

2. Add: cake flour, sugar, dried milk, baking powder, baking soda, salt, and pre gelatinized wheat starch.
3. Gradually add the water in step 3, and mix on low for 4 minutes. Scrape the bowl.
4. Combine eggs, vanilla flavor, and water then add them in two parts.
5. Mix for 2 minutes after each half addition from step 4 and scrape after each addition.
6. Make sure that the mix is properly combined, and if it's not then mix it a few more minutes.
7. Scale 580 grams of batter in each pan.
8. Bake at 360 degrees Fahrenheit for 29 minutes.

The following table shows the nutritional information for the control and test cakes, which shows the reduced trans and saturated fat levels.

Cake Nutritional Information

| Nutrient | Control | Test |
| --- | --- | --- |
| Gram weight, g | 100 | 100 |
| Calories, kcal | 308 | 273 |
| Calories from Fat | 123 | 75.6 |
| Protein, g | 4.64 | 4.99 |
| Carbohydrates, g | 42.9 | 46.3 |
| Dietary Fiber, g | 0.57 | 1.5 |
| Total Sugars, g | 25.8 | 27.7 |
| Total Fat, g | 13.6 | 8.4 |
| Saturated Fat, g | 3.18 | 1.98 |
| Trans Fatty Acid, g | 3.4 | 1.79 |

This table shows the physical properties of the cakes in terms of the cakes height and volume, which shows the test cake with reduced fat and Citri-Fi™ 100 citrus fiber had increased height and volume.

| Cake | height (mm) | volume (mm³) |
| --- | --- | --- |
| Control | 38.2 | 1386 |
| Test | 41.6 | 1510 |

Because shortening has a softening effect in bakery products and allows them to stay fresher longer, these results show that Citri-Fi™ citrus fiber can be used to replace fat, shortening, and oil and maintain a product with similar eating qualities to the control.

EXAMPLE 7

Reduced Fat Bread

Bread was made according to the formula shown in the following table where 100% of the shortening was placed in the formula. Citri-Fi™ 200 citrus fiber and guar gum was used in this test.

| Item Name | Control Formula | 50% fat Formula |
| --- | --- | --- |
| Flour | 1000 | 1000 |
| Water, municipal | 620 | 620 |
| granulated sugar | 90 | 90 |
| extra water | 0 | 90 |
| compressed yeast | 70 | 70 |
| Shortening | 60 | 0 |
| wheat bran | 30 | 30 |
| Salt | 22 | 22 |
| Citri-Fi ™ 200 citrus fiber and guar gum | 0 | 15 |
| Calcium proprionate | 4 | 4 |
| Sodium stearyol lactylate | 2 | 2 |

Here is the nutritional information for the bread.

| Nutrient | Control | Test |
| --- | --- | --- |
| Gram weight, grams | 100 | 100 |
| Calories, kcal | 270 | 260 |
| Protein, g | 9 | 9 |
| Carbohydrates, g | 55 | 55 |
| Dietary Fiber, g | 2 | 2 |
| Total Sugars, g | 6 | 6 |
| Total Fat, g | 2 | 1 |
| Saturated Fat, g | 0 | 0 |
| Trans Fatty Acid, g | 0.5 | 0 |

The loaf volume, eating characteristics, and grain for both breads came out looking nearly identical to each other. To the touch the 100% less shortening bread was significantly softer than the control.

EXAMPLE 8

Reduced Fat Sweet Rolls

Citri-Fi™ 100 citrus fiber was used to make a 50% reduced fat shortening in a sweet roll according the formula in the following table.

| Item Name | Control | 50% reduced Shortening |
| --- | --- | --- |
| Flour, all purpose | 500 | 500 |
| Flour, pastry | 500 | 500 |
| Shortening | 240 | 120 |
| Eggs, whole | 240 | 240 |
| Milk, whole, dry pwd | 60 | 60 |
| Water, municipal | 450 | 450 |
| Yeast, compressed | 60 | 60 |
| Salt, table | 17.5 | 17.5 |
| Sugar, granulated | 240 | 240 |
| Citri-Fi ™ 100 citrus fiber | 0 | 34.8 |
| Water, municipal | 0 | 139 |

Here is the nutritional information for the sweet roll formula, which was generated using Genesis software.

Sweet Roll Nutritionals

| Nutrients | Control | 50% reduced Shortening | Units |
| --- | --- | --- | --- |
| Gram Weight | 100 | 100 | g |
| Calories | 313.56 | 265.08 | kcal |
| Calories from Fat | 113.23 | 65.76 | kcal |
| Calories from SatFat | 31.41 | 18.81 | kcal |

-continued

| Nutrients | Control | 50% reduced Shortening | Units |
|---|---|---|---|
| Protein | 7.5 | 7.43 | g |
| Carbohydrates | 44.26 | 44.46 | g |
| Dietary Fiber | 2.88 | 3.91 | g |
| Soluble Fiber | 0.3 | 0.84 | g |
| Total Sugars | 11.77 | 12.04 | g |
| Fat | 12.74 | 7.39 | g |
| Saturated Fat | 3.49 | 2.09 | g |
| Trans Fatty Acid | 3.22 | 1.58 | g |

The physical appearance of the sweet rolls and the eating qualities in terms of taste, texture, and freshness throughout the products shelf life were noted to be very similar to each other.

EXAMPLE 9

Reduced Fat Muffins

In addition to making a reduced fat shortening, roll-in, or spread, expanded cell wall materials can also be used to reduced the fat in an oil. The resultant reduced fat oil has a similar consistency as a standard oil and when this is added into a formula, the resultant product has very similar eating qualities compared to the full fat oil. In this experiment, Citri-Fi™ 100 citrus fiber was used to reduce oil in a muffin formula. A Multi-Foods muffin mix (#44812) was used in this testing and the control formula was followed according to the instructions on the bag. The formula used for the muffins is shown below:

| Ingredient Name | Control Formula | Test Formula |
|---|---|---|
| Multi Foods cake base 44812 | 100 | 100 |
| Eggs, whole | 35 | 35 |
| Oil, veg, pure | 30 | 15 |
| Water, municipal | 22 | 22 |
| Citri-Fi ™ 100 citrus fiber | 0 | 3 |
| Blueberries, fresh, ea | 30 | 30 |
| Water, municipal | 0 | 18 |

The muffins made according to the formula above were noted to have very similar volume and eating qualities that would be difficult for a person to distinguish one from the other. Here is the nutritional information for the reduced fat muffins, which was calculated using Genesis software.

Muffin Nutritionals Per 100 g

| Nutrients | Control | 50% reduced shortening | Units |
|---|---|---|---|
| Gram Weight | 100 | 100 | g |
| Calories | 330 | 270 | kcal |
| Protein | 4 | 4 | g |
| Carbohydrates | 40 | 41 | g |
| Dietary Fiber | 1 | 2 | g |
| Total Sugars | 24 | 24 | g |
| Fat | 18 | 11 | g |
| Saturated Fat | 3 | 2 | g |
| Trans Fatty Acid | 0 | 0 | g |

EXAMPLE 10

Using expanded cell wall materials to for fat reduction not only applies to dairy products, but applies to imitation dairy products as well. Imitation cheeses can be made using the expanded cell wall materials to replace part of the fat in the cheese and a product with near identical properties to the full fat control can be made. In the first example, Citri-Fi 200 FG containing citrus fiber and guar gum available from Fiberstar, Inc. (Willmar, Minn.) was used as the source of expanded fiber materials. Similar results would be expected with other expanded cell wall plant fiber materials. The following formulation was where the expanded cell wall material and water was used to replace approximately 33% of the fat. In this example the amount of fiber materials used was ⅑ times the amount of shortening replaced and 8 parts of water per part of fiber material was used to make up the balance of the shortening taken out. Both the control and reduced fat cheese formulation were made the same way. All the ingredients accept the shortening were mixed in a kitchen aide mixer for 15 minutes, then the shortening was added and the mixture was mixed for an additional five minutes. Next, the cheese was placed in a Rapid Visco Analyzer (RVA) available from Newport Scientific (Unit 454, 1 Silk House, Park Green, Macclesfield SK11 7QJ UK) and mixed at 450 rpm for 7 minutes and 94 degrees Celsius. RVA's are commonly used for measuring the viscosity properties of slurries that undergo a heating and shearing process. Next, the cheese was placed in small container to set up and chilled in a refrigerator. The table below shows the formulation.

| Item Name | Control (lbs) | Reduced Fat |
|---|---|---|
| Rennet Casein | 23.0 | 23.0 |
| Vegetable Shortening | 23.0 | 15.3 |
| Salt | 1.8 | 1.8 |
| Sodium Citrate | 2.5 | 2.5 |
| Citric Acid | 0.7 | 0.7 |
| Water | 49.0 | 49.0 |
| Citri-Fi ™ 200 FG | 0.0 | 0.9 |
| Additional Water | 0.0 | 6.8 |

Nutritional information for the imitation cheese formulation is shown below:

| Nutrients per 50 g | Control | Reduced Fat | Units |
|---|---|---|---|
| Gram Weight | 50 | 50 | G |
| Calories | 146.06 | 111.88 | Kcal |
| Calories from Fat | 104.33 | 69.87 | Kcal |
| Calories from Saturated Fat | 31.85 | 21.23 | Kcal |
| Protein | 9.2 | 9.24 | G |
| Carbohydrates | 1.6 | 2.05 | G |
| Dietary Fiber | 0 | 0.41 | g |
| Soluble Fiber | 0 | 0.21 | G |
| Total Sugars | 0.01 | 0.05 | G |
| Monosaccharides | 0 | 0 | G |
| Disaccharides | 0 | 0 | G |
| Other Carbs | 1.59 | 1.59 | G |
| Fat | 11.59 | 7.76 | G |
| Saturated Fat | 3.54 | 2.36 | g |
| Mono Fat | 0 | 0 | g |
| Poly Fat | 0 | 0 | g |
| Trans Fatty Acid | 3.45 | 2.3 | g |

Manufacturing viscosity, viscosity after remelt, set up time, and the cheese texture were measured using an RVA and texture analyzer. The cooking viscosity was measured using the RVA right at the end of the 7 minute cycle at 94 C. The remelt viscosity was measured after the cheese was remelted and the minimum viscosity was measured. This would be a measure of the flowability of the cheese when it is melted such was what would happen when a pizza is in the oven. The set up time refers to the amount of time it takes the cheese to set up to 5000 cP after it was melted. The texture firmness of the cheese was measured using the texture analyzer and refers to how firm the cheese is when it is chilled. The table of these results are shown below.

| Sample | Manufacture Cook Viscosity (cP) | Remelt Minimum Viscosity (cP) | Set up time (min) | Texture Firmness (N) |
|---|---|---|---|---|
| Control | 2642 | 717 | 10.79 | 103 |
| ⅓ Fat reduction | 3011 | 712 | 10.9 | 73 |

As the data indicates, all the data measurements for cook viscosity, remelt minimum viscosity, set up time, and texture were noted be very similar to each other. Also, eating qualities of both products were also noted to be similar to each other. Another measure not quantified but was important for the mozzarella formulation was its stringiness when heated and visually, both the control and reduced fat products were noted to have similar stringiness properties.

EXAMPLE 11

Another imitation cheese formulation was conducted and in this formulation the expanded cell wall materials and water was used to replace 50% of the fat in the product.

| Item Name | Control (lbs) | Reduced Fat |
|---|---|---|
| Rennet Casein | 23.0 | 23.0 |
| Vegetable Shortening | 23.0 | 11.5 |
| Salt | 1.8 | 1.8 |
| Sodium Citrate | 2.5 | 2.5 |
| Citric Acid | 0.7 | 0.7 |
| Water | 49.0 | 49.0 |
| Citri-Fi ™ 200 FG | 0.0 | 1.64 |
| Additional Water | 0.0 | 9.86 |

The same cook viscosity, remelt viscosity, set up time, and firmness measurements were taken as in Example 10. The results are shown in the table below.

| Sample | Manufacture Cook Viscosity (cP) | Remelt Minimum Viscosity (cP) | Set up time (min) | Texture Firmness (N) |
|---|---|---|---|---|
| Control | 2642 | 717 | 10.79 | 103 |
| Test 3 | 4543 | 966 | 10.64 | 76 |

As the data indicates, even at the 50% fat reduction, the measurements for cook viscosity, remelt minimum viscosity, set up time, and texture were noted be very similar to each other. Also, eating qualities of both products were also noted to be similar to each other. Another measure not quantified but was important for the mozzarella formulation was its stringiness when heated and visually, both the control and reduced fat products were noted to have similar stringiness properties A Cheese set-up example may include the following, using these definitions that are terms of art. Cook viscosity means viscosity of the cheese just after manufacture. Higher viscosity would indicate a thicker product to poor out of the cooler. Remelt and remelt minimum viscosity indicates the flowability of the cheese at high temperatures (higher than room temperatures). A low minimum value would indicate a more flowable product at high temperatures. This can be an important attribute for dips and sauce type products. Remelt set-up time indicates the time taken by the cheese to reach a set viscosity (in these tests, it is 5000 cP for cheese analogs and 2500 cP for sauces). A longer set-up time means that the melted cheese sets up later after it is cooled.

Texture profile analysis includes firmness and stickiness. Firmness measures the firmness of the product, with a higher value being more firm. Stickiness measures the surface stickiness of the product, with a higher value being more sticky.

Within the next examples, it shall be noted that extra water to hydrate the fiber is not used, but extra skim milk is. This is due to the fact that solids content must be kept consistent in order to not affect the freezing points, or composition. This will also minimize the ice crystal formation in frozen products, as well as prevent formation of off flavors. Also adding skim milk rather than water should prevent lipid oxidation and other chemically occurring reactions.

EXAMPLE 12

Several other dairy products can be reduced in fat with the expanded cell wall materials.

Ice Cream, especially soft serve formulation and comparison:

| Ingredients | Control | 33% Reduced Fat |
|---|---|---|
| Milk | 1340 | 1340 |
| Cream | 650 | 434 |
| Sugar | 420 | 420 |
| Gelatin | 6 | 6 |
| Citri-fi 200FG | 0 | 27 |
| Extra Skim Milk | 0 | 189 |
| Totals | 2416 | 2416 |

In order to produce the soft serve the following steps were taken.
1. All ingredients were blended using a beverage blender.
2. To hydrate gelatin, mix was heated to 165° F.
3. All ingredients were poured into the ice cream freezer hopper.
4. Small containers were filled from the spout of the machine after 10 minutes of agitation.

Below is the Nutritional Information for Soft Serve:

| Nutrients | Control | Reduced Fat | Units |
|---|---|---|---|
| Gram Weight | 100 | 100 | g |
| Calories | 179.99 | 154.37 | kcal |
| Calories from Fat | 90.49 | 60.97 | kcal |

-continued

| Nutrients | Control | Reduced Fat | Units |
|---|---|---|---|
| Calories from SatFat | 56.35 | 37.9 | kcal |
| Protein | 2.65 | 2.82 | g |
| Carbohydrates | 20.82 | 21.86 | g |
| Dietary Fiber | 0 | 0.84 | g |
| Soluble Fiber | 0 | 0.42 | g |
| Total Sugars | 20.09 | 20.54 | g |
| Monosaccharides | 0 | 0 | g |
| Disaccharides | 17.38 | 17.38 | g |
| Other Carbs | 0.72 | 0.48 | g |
| Fat | 10.05 | 6.77 | g |
| Saturated Fat | 6.26 | 4.21 | g |
| Mono Fat | 2.9 | 1.95 | g |
| Poly Fat | 0.37 | 0.25 | g |
| Trans Fatty Acid | 0.3 | 0.2 | g |

Both the reduced fat and control ice creams were noted to be very similar to each other in terms of taste and texture. One potential benefit noted with the reduced fat version was the improvement of the ice crystal formation with the reduced fat as the number of ice crystals were smaller and fewer, which gave the ice cream a slightly more creamy texture.

A Cheese set-up example may include the following, using these definitions that are terms of art. Cook viscosity means viscosity of the cheese just after manufacture. Higher viscosity would indicate a thicker product to poor out of the cooler. Remelt and remelt minimum viscosity indicates the flowability of the cheese at high temperatures (higher than room temperatures). A low minimum value would indicate a more flowable product at high temperatures. This can be an important attribute for dips and sauce type products. Remelt set-up time indicates the time taken by the cheese to reach a set viscosity (in these tests, it is 5000 cP for cheese analogs and 2500 cP for sauces). A longer set-up time means that the melted cheese sets up later after it is cooled.

Texture profile analysis includes firmness and stickiness. Firmness measures the firmness of the product, with a higher value being more firm. Stickiness measures the surface stickiness of the product, with a higher value being more sticky.

EXAMPLE 13

Reduced Fat Vanilla Ice Cream

Citri-Fi® 100 FG, citrus fiber produced by Fiberstar, Inc., was used in testing 33% reduced fat vanilla ice cream. It was determined that an optimal level of fiber was at a level of 0.077 times the weight of cream removed and the amount of skim milk was 12 times the weight of Citri-fi® 100 FG. In order to determine the nutritional analysis for the control and test, Genesis software from Esha Research (Salem, Oreg.) was used. See Table 1 for nutritional breakdown.

TABLE 1

| Nutritional Data | | |
|---|---|---|
| | Control | 33% Reduced Fat |
| Gram Weight | 70 g | 70 g |
| Calories | 138.31 kcal | 117.13 kcal |
| Calories from Fat | 74.77 kcal | 49.87 kcal |
| Calories from SatFat | 47.04 kcal | 31.31 kcal |
| Protein | 1.34 g | 1.63 g |
| Carbohydrates | 14.88 g | 15.71 g |
| Dietary Fiber | 1.83 g | 2.26 g |

TABLE 1-continued

| Nutritional Data | | |
|---|---|---|
| | Control | 33% Reduced Fat |
| Soluble Fiber | 0 g | 0.22 g |
| Total Sugars | 12.84 g | 13.21 g |
| Monosaccharides | 0 g | 0 g |
| Disaccharides | 11.19 g | 11.19 g |
| Other Carbs | 0.18 g | 0.21 g |
| Fat | 8.97 g | 5.98 g |
| Saturated Fat | 5.23 g | 3.48 g |
| Mono Fat | 0.01 g | 0.01 g |
| Poly Fat | 0 g | 0 g |
| Trans Fatty Acid | 0 g | 0 g |
| Cholesterol | 0.41 mg | 0.49 mg |
| Water | 30.81 g | 37.1 g |
| Vitamin A - IU | 367.23 IU | 281.27 IU |

Table 2 indicates the formulation used to produce a 12% fat control Vanilla Ice Cream and a 33% reduced fat version.

TABLE 2

| Ice Cream Formulation | | |
|---|---|---|
| Ingredient | Control | Reduced Fat |
| Skim Milk | 486.8 | 486.8 |
| Cream | 320 | 213 |
| Sugar | 160 | 160 |
| Keystone 6441 | 33.16 | 33.16 |
| Citri-fi 100FG | 0 | 8.23 |
| Extra Skim Milk | 0 | 98.77 |
| Totals | 999.96 | 999.96 |

The following instructions were used to produce the control and reduced fat ice cream on a bench top scale.
1. All ingredients including skim milk, sugar, keystone and Citri-fi® sheared on high for 1 minute in a beverage blender.
2. The Ice cream mix heated to 165° F.
3. Ice cream mix is then cooled in a refrigerator for 2 hours.
4. Mix is then poured into Ice cream freezer, Euro-Pro Electronic Ice Cream Maker (Champlain, N.Y.), for 45 minutes.
5. Upon completion of the freezing process the ice cream is stored in plastic containers and kept in a freezer for at least 1-2 hours before consumption.

When Citri-fi® 100 FG is added 33% reduced fat ice cream, it is evident that not only does the fiber produce similar eating qualities to the full fat control, but it also is capable of creating a thicker, creamier texture. Table 3 and Chart 1, depicts how an increase in viscosity is seen when Citri-fi® 100 FG is added to replace removed milk fat.

TABLE 3

| Viscosity of Ice Cream Mix Prior to Freeze | | | | | |
|---|---|---|---|---|---|
| | rpm | | | | |
| | 0.5 | 10 | 60 | 100 | 200 |
| Full Fat Control Vanilla Ice Cream | | | | | |
| 1 | 623.4 | 406.1 | 283.9 | 250.1 | 214.8 |
| 2 | 635.9 | 405.5 | 284.4 | 205.4 | 213.6 |
| Average: | 629.65 | 405.8 | 284.15 | 227.75 | 214.2 |

TABLE 3-continued

Viscosity of Ice Cream Mix Prior to Freeze

| | rpm | | | | |
|---|---|---|---|---|---|
| | 0.5 | 10 | 60 | 100 | 200 |
| 33% Reduced Fat Vanilla Ice Cream | | | | | |
| 1 | 2711 | 1338 | 645 | 562 | 428 |
| 2 | 2795 | 1341 | 657 | 563 | 427.7 |
| Average: | 2753 | 1339.5 | 651 | 562.5 | 427.85 |

Since ice cream is an indulgence food, purchased for its delicate texture and mouth feel, it is essential that a reduced fat version is comparable in these areas. When evaluating the full fat control ice cream in comparison to the 33% reduced fat with Citri-fi® 100 FG, it is evident with the presence of citrus fiber, comparable if not better results are obtained.

EXAMPLE 14

Reduced Fat Frozen Yogurt

Another frozen dairy treat, similar in application to ice cream is frozen yogurt. To produce a reduced fat frozen yogurt, Citri-fi® 200FG was used at a level of 0.125 times the fat to achieve a 33% and 50% reduction in fat. The amount of skim milk used was 7 times the weight of the fiber. The nutritional breakdown for both the control and test frozen yogurts was determined by Genesis software from Esha Research (Salem, Oreg.). The formula in Table 1 indicated the usage level of all ingredients.

TABLE 1

Formulation of Frozen Yogurt

| Ingredients | Control | 33% Reduced Fat | 50% Reduced Fat |
|---|---|---|---|
| Skim Milk | 500 | 500 | 500 |
| Cream | 320 | 213 | 160 |
| Sugar | 140 | 140 | 140 |
| Corn Syrup Solids | 20 | 20 | 20 |
| Keystone 9770 | 7.4 | 7.4 | 7.4 |
| Citri-fi ® 200FG | 0 | 13.4 | 20 |
| Extra Skim Milk | 0 | 93.8 | 140 |
| Vanilla Yogurt | 500 | 500 | 500 |
| Totals | 1487.4 | 1487.6 | 1487.4 |

Table 2 highlights the nutritional breakdown of the frozen yogurt as determined by Genesis.

The following instructions were used in order to produce control and reduced fat yogurt on a bench top scale.
 1. The skim milk and cream were sheared on low in a blender for 20 seconds
 2. Dry solids were added to blender and sheared for another 30 seconds on low speed.
 3. The mix is then heated to achieve a temperature of 160° F.
 4. Yogurt is sheared for 30 seconds add added to the mix once it has cooled down to at least 40° F.
 5. Mix is then poured into Ice cream freezer, Euro-Pro Electronic Ice Cream Maker (Champlain, N.Y.), for 45 minutes.
 6. Upon completion of the freezing process the ice cream is stored in plastic containers and kept in a freezer for at least 1-2 hours before consumption.

Because the texture and mouth feel of frozen yogurt is dependant on the presence of fat, when the level of cream is reduced it is important to maintain similar sensory characteristics. From the production of full fat frozen yogurt and 33% and 50% reduced fat with Citri-fi® 200FG, it was noted that the controls and tests had comparable textures. These results indicate that Citri-fi® 200FG, is indeed capable of functioning as a fat in a frozen yogurt application.

EXAMPLE 15

Reduced Fat Cheddar Cheese

Reduced fat cheddar cheeses were prepared with 33% reduction in fat from typical cheddar cheese. Reduced fat cheese without a fat mimetic present served as the control and the test was prepared with Citri-fi® 100 FG at a level of 1% of the milk weight. Cheese wheels were aged for two weeks under vacuum packaging prior to lab analysis and sensory evaluation to allow for salt equilibrium and flavor development. Upon testing, the presence of citrus fiber increased yields by 17% and significantly increased moisture content. Fat contents as determined by Babcock procedures proved fat contents were slightly higher in the control (See table 1 for complete analysis). Textural analysis showed comparable strength in the control and citrus fiber version (See Table 2). The Cheddar with the presence of fiber had a texture similar to that of a full fat variety. With a reduction in fat in Cheddar, comes a rubbery, harder texture that was not seen with the application of fiber.

Raw milk produced from the University of Wisconsin-River Falls Lab farm was obtained and pasteurized via HTST at 167° F. for 25 seconds. For the reduced fat control cheese (RFCF) and fiber enhanced cheese (RFCF), milk was standardized to 2% (w/w) fat by mixing skim milk and whole milk. Mesophilic liquid starter (Ells *Lactis cremoris*) was used at levels of 0.2% and provided by Chr. Hansen (Milwaukee, Wis.). Chymater™ Liquid rennet also from Pfizer, Inc. was used at a rate of 40 mL per 1000 lbs. Annatto from Chr. Hansen was used at a rate of 40 mL/1000 lbs as well as calcium chloride at a rate of 35 mL/1000 lbs. Both cheeses were produced according to standard procedures as written by May (May, 2006a) and utilized for cheddar production in the Falcon Foods Plant.

Briefly, starter culture was added when the milk reached 88° F. (as heated by steam kettle) and was allowed to ripen for 20 minutes. Liquid rennet was then slowly stirred in and allowed to set for 45 minutes. After setting up the curd was cut and allowed a healing time of 10 minutes. The curds were then cooked, increasing the temperature by 2° F. every five minutes for until a temperature of 100° F. was obtained. Modifications were made in the cheddaring steps to accommodate for smaller presses. Cheddaring steps were omitted and replaced with a stirred curd method. Part of the whey was drained and curds were stirred with slow draining until a titratable acidity of 0.30 was reached. The curds were then salted at 0.3% of the milk weight and pressed under 80 psi for 14 hours. The cheese was then vacuum packed and stored at 40° F. for 14 days. After 2 weeks of aging, samples were taken from each block in order to run lab analysis.

TABLE 1

Proximate Analysis of Reduced Fat Cheddars

| Cheese | Fat (on dry basis) | Moisture | Yield | Salt | pH |
|---|---|---|---|---|---|
| RFC | 35.08% | 45.85% | 9.13% | 1.82% | 4.82 |
| RFCF | 32.17% | 53.37% | 10.98% | 1.76% | 4.76 |

TABLE 2

Q-test data from compression analysis

| Samples | Peak Stress | Peak Load |
|---|---|---|
| RFC | 259 psi | 50.9 lbs. |
| RFCF | 255 psi | 50.1 lbs. |

Fiber derived from citrus by-product, was capable of increasing moisture by binding whey and water in reduced fat cheddar production. The increased yield found may prove to be beneficial for cheddar pizza topping cheese or blends for processing.

EXAMPLE 16

Reduced Fat Washed Curd Cheese

Besides making typical reduced fat cheddar, a washed curd variety can be made producing a Monterey Jack, Colby or Farmer's Cheese. The level of Citri-fi® M40 used is at a level of 0.125 times the amount of milk fat replaced with additional skim milk added at a level of 7 times the fiber. Table 1 indicates the formulation used to produce a washed curd cheese.

TABLE 1

Formulation Washed Curd Method

| Cheese Type | Standardization | Calcium Chloride | Mesophilic Starter | Coagulator (Rennet) | Citri-fi® M40 | Extra Skim Milk |
|---|---|---|---|---|---|---|
| Full Fat Control | Milk fat 3.5% ± 0.2 | 35 mL/1000 lbs. | 40 mL/1000 lbs. | 40 mL/1000 lbs. | 0 | 0 |
| Reduced Fat Control | Milk fat 2.0% ± 0.2 | 35 mL/1000 lbs. | 40 mL/1000 lbs. | 40 mL/1000 lbs. | 0 | 0 |
| Reduced Fat with Citri-fi® M40 | Milk fat 2.0% ± 0.2 | 35 mL/1000 lbs. | 40 mL/1000 lbs. | 40 mL/1000 lbs. | 0.125 x Milk fat replaced | 7 x fiber level |

*Levels of calcium chloride, starter, and coagulator are dependant on concentrations of product used.
*Method Implied is according to steps for production of Farmer's Cheese, Monterey Jack or Colby with curds washed at 70° F.

With the goal of 50% reduction, it can be seen that with the presence of Citri-fi® M40 comparable amounts of fat are obtained between a reduced fat control and the reduced fat with citrus fiber. This means that the citrus fiber is not causing extra milk fat to run out with the whey. Table 2 indicates lab analysis conducted on the samples. Fat determinations of cheese were made using the Babcock method with sulfuric acid (Garver electrifuge; Milk and Cream Babcock). Moisture was measured via Brabender oven (CW Brabender; Moisture Volatiles Tester SAS) after 45 minutes of exposure.

TABLE 2

Lab Analysis

| | Moisture Content | Fat (on dry Basis) | Percent Yielded |
|---|---|---|---|
| Full Fat Control | 56.40% | 72.25% | 10.64% |
| Reduced Fat Control | 48.83% | 35.18% | 9.00% |
| Reduced Fat with Citri-fi® M40 | 57.58% | 36.54% | 10.94% |

As it can be noted the reduced fat with Citri-fi® M40, has a comparable moisture content to the full fat control. It has been found that when fat is reduced in cheese, it often becomes rubbery in texture. With the use of Citri-fi® M40, a texture and yield similar to the full fat control is obtained. When milk fat is reduced within a cheese, it is most desirable to have eating qualities similar to that of the control.

EXAMPLE 17

Cream Cheese

Reduced fat cream cheese can be produced with similar sensory attributes to a full fat version with the addition of Citri-fi® 100FG. Citri-fi® 100FG was found capable of mimicking fat at the addition level of 0.091 times the milk fat replaced. Extra skim milk was added at a level of 10 times that of the fiber. Two reduced fat variations were produced at a fat reduction level of 33% and 50%. In order to compile a nutritional report, Genesis software from Esha Research (Salem, Oreg.) was used. The cheese was made according to the formulation as indicated in table 1 below.

TABLE 1

Formula for Cream Cheeses

| Ingredients | Control | 33% Reduced Fat | 50% Reduced Fat |
|---|---|---|---|
| Cream | 234 | 156 | 117 |
| Buttermilk | 5.68 | 5.68 | 5.86 |
| Salt | 0.87 | 0.87 | 0.87 |
| Skim milk | 50 | 50 | 50 |

TABLE 1-continued

Formula for Cream Cheeses

| Ingredients | Control | 33% Reduced Fat | 50% Reduced Fat |
|---|---|---|---|
| Extra Skim Milk | 0 | 70.9 | 106 |
| Citri-fi 100FG | 0 | 7.09 | 10.6 |
| Totals | 290.55 | 290.54 | 290.33 |

In order to produce the cream cheese the following instructions were followed.
1. If applicable, fiber was sheared into milk for 30 seconds in a beverage blender.
2. The skim milk and cream was mixed together by hand.
3. Mixture was heated to 145° F.
4. Milk was cooled to 90° F. and buttermilk was added.
5. The cream cheese milk mix was then kept at room temperature until a pH of 4.7 was reached, roughly after 12 hours of sitting.
6. Solidified cream cheese was then refrigerated for 2 hours.
7. Salt was stirred in and allowed to equilibrate in the mixture for another 4 hours.

TABLE 2

Nutritional Breakdown for Cream Cheeses

|  | Control | 33% Reduced Fat | 50% Reduced Fat | Units |
|---|---|---|---|---|
| Gram Weight | 30 | 30 | 30 | g |
| Calories | 82.67 | 68.54 | 63.55 | kcal |
| Calories from Fat | 80.59 | 63.6 | 57.6 | kcal |
| Calories from SatFat | 50.77 | 40.03 | 36.23 | kcal |
| Protein | 0.21 | 0.42 | 0.49 | g |
| Carbohydrates | 0.3 | 1.01 | 1.26 | g |
| Dietary Fiber | 0 | 0.43 | 0.58 | g |
| Soluble Fiber | 0 | 0.22 | 0.3 | g |
| Total Sugars | 0.28 | 0.54 | 0.63 | g |
| Fat | 9.67 | 7.63 | 6.91 | g |
| Saturated Fat | 5.64 | 4.45 | 4.03 | g |
| Trans Fatty Acid | 0 | 0 | 0 | g |
| Cholesterol | 0.1 | 0.15 | 0.16 | mg |
| Water | 5.19 | 9.35 | 10.82 | g |
| Vitamin A - IU | 332.77 | 273.96 | 253.18 | IU |
| Vitamin C | 0.03 | 0.05 | 0.06 | mg |
| Vitamin D - IU | 2.08 | 3.96 | 4.62 | IU |
| Vitamin D - mcg | 0.05 | 0.1 | 0.12 | mcg |
| Calcium | 5.8 | 10.38 | 12 | mg |
| Potassium | 0.01 | 0.01 | 0.01 | mg |
| Selenium | 0 | 0 | 0 | mcg |
| Sodium | 38.15 | 33.1 | 31.31 | mg |

The cream cheese produced with Citri-fi® 100FG posses similar texture, flavor, and appearance even when fat was reduced by 33% and 50%. Because of the higher levels of saturated fat present in cream cheeses, producing a comparable reduced fat version is essential to creating a healthy diet that incorporates dairy products. With the presence of Citri-fi® 100FG in the formulation at a 33% reduction in total fat, the level of saturated fat decreases by 21%. With a 50% reduction in total fat, a decrease of 28.6% of saturated fat is achieved.

EXAMPLE 18

Mouthfeel Enhancement of Skim Milk

Three tests were made according to the following guidelines Control: untouched skim milk; Test 1: 0.25% Citri-Fi® 100 FG (a finer granulated citrus fiber); Test 2: 0.5% Citri-Fi® 100 FG and Test 3: 0.5% Citri-Fi® 100 FG with 0.01% Kappa Carrageenan. All dry solids were hand mixed into skim milk and batch pasteurized for 30 minutes at 145° F. with occasional stifling. Each sample was then homogenized with stage 1 at 1500 psi and stage 2 at 500 psi. In order to fully understand the affects of fiber addition to milk the tests were analyzed to find quantitative and qualitative characteristics. The samples were tested for ability to withstand centrifugal force, viscosity, freezing point, composition sensory properties and nutritional value.

In order to see if the solids would stay in suspension over extended periods of time, each sample, except the control, was placed in a centrifuge. Three tubes were weighed and each was filled with 15 g of each test lot and centrifuged with a Damon/IEC Division IEC HN-SII Centrifuge for 10 minutes at 2500 "Gs". Then the supernatant was poured off and the tubes were reweighed. The weight of the tube was then subtracted from the weight of the tube with the polluted solids. See data table 1 for results.

TABLE 1

Centrifuges Force applied to Samples

| Test | Wt. Of Tube | Wt. Of Sample | Wt. Of Tube & Solids | Wt. Of Solids | % out of solution |
|---|---|---|---|---|---|
| Test 1 | 11.545 | 15.0161 | 12.1577 | 0.6127 | 0.04% |
| Test 2 | 11.5612 | 15.0111 | 13.739 | 2.1778 | 0.15% |
| Test 3 | 11.5101 | 15.0247 | 12.03 | 0.5199 | 0.03% |

With the presence of Kappa Carrageenan, citrus fiber was able to suspend at a level of 0.5% much better than at a level of 0.25% on its own.

Viscosity of each sample was obtained to detect differences in thickness. Each sample was poured into 10 oz. glass sterile containers. Readings were taken with a Brookfield Programmable DV-II+Viscometer starting at 0.5 rpm progressing to 200 rpm. Vein spindles were changes as rpm values increased. Data Table 2 and FIG. 1 (chart 2) demonstrate the values as measured in cP.

Control

| | RPM | | | | |
|---|---|---|---|---|---|
| | 0.5 | 10 | 60 | 100 | 200 |
| 1 | NA | NA | 30 | 46 | 31.1 |
| 2 | NA | NA | 22.3 | 43.1 | 27.6 |

Test 1

| | RPM | | | | |
|---|---|---|---|---|---|
| | 0.5 | 10 | 60 | 100 | 200 |
| 1 | 24.6 | 10.3 | 39.1 | 42.7 | 30.2 |
| 2 | 19.6 | 9.82 | 28.3 | 36.9 | 28.1 |

Test 2

| | RPM | | | | |
|---|---|---|---|---|---|
| | 0.5 | 10 | 60 | 100 | 200 |
| 1 | 98 | 70.2 | 39 | 49 | 30.6 |
| 2 | 93.3 | 65 | 29.3 | 44.6 | 28.1 |

Test 3

| | RPM | | | | |
|---|---|---|---|---|---|
| | 0.5 | 10 | 60 | 100 | 200 |
| 1 | NA | 54 | 41 | 43.3 | 41 |
| 2 | NA | 56 | 39 | 43.9 | 43.1 |

Since the objective is to create a product, in which will have similar attributes to its full fat counterpart, it is important that as citrus fiber is added thickening of the skim milk occurs. In this case, it is noted that the Citri-Fi® 100 FG is capable of increasing viscosity, giving the sensation of a whole milk mouth feel.

In order to obtain the freezing points of the samples The Advanced Cryoscope: Model 4D3 was used. This instrument is made by Advanced Instruments, INC: Dairy and Food Division. Results are seen in table 3.

TABLE 3

Freezing point determination of samples.

| Sample | Freezing Point (m °H) |
|---|---|
| Control | 541 |
| 1 | 550 |
| 2 | 555 |
| 3 | 565 |

It is essential to understand freezing points of the samples as these values will affect how the milk will react in ice cream, soft serve and frozen yogurt production. It is seen that the freezing point is depressed with the addition of citrus fiber. This must be understood and can be accommodated for in the processing flow.

Samples were also consumed to create a textural and sensory profile. Table 4 outlines observances upon consumption of the samples.

TABLE 4

Sensory Profile of Samples

| Control | clean flavor |
|---|---|
| Test 1 | smooth, slight malty flavor |
| Test 2 | smooth, slight fiber feel, definite malty flavor |
| Test 3 | smooth, gel like texture, malted oatmeal flavor |
| Test 4 | smooth, slight malty flavor |

From this study it can be concluded that it is justifiable to add Citri-fi® at levels of 0.25% and 0.5% into skim milk. It was also found that with carrageenan added to the Citri-fi® and skim milk, the suspendability of the fiber increases. The addition of fiber to skim milk may allow a whole milk mouth feel to be obtained. Knowing how the fiber will react to the milk will allow it to be easily used in other dairy applications.

What is claimed:

1. A method of forming an edible dairy containing composition comprising the steps of:
   a) soaking raw material from organic fiber plant mass comprising at least 50% by weight of all fiber mass as parenchymal fiber mass in an aqueous solution in complete absence of refinement process introduced metal or metallic hydroxides;
   b) draining the raw material;
   c) allowing the raw material to soak for at least 4 hours so that the fiber mass is softened;
   d) shearing the softened fiber mass to open up the fibers to at least 50% of theoretic potential;
   e) drying sheared softened fiber mass to produce a highly refined cellulose fiber having a water retention capacity of at least 50 g H20/g dry weight of fiber; and
   f) mixing together a combination of at least one of each of
      i) cheese, imitation cheese, yogurt, ice cream, ice milk, milk, soft serve, cream cheese, sour cream, frozen yogurt, or sherbet composition and
      ii) 0.05-30% by weight of the highly refined cellulose fiber defined by a fiber material that has a total dietary fiber content greater than 30% as measured by AOAC 991.43 and a water holding capacity greater than five parts water per part fiber as measured by AACC 56-30 and is less than 90% soluble fiber.

2. The method of claim 1 wherein i) and ii) are blended to distribute ingredients essentially uniformly throughout a blended mixture high parenchymal cell wall derived cellulosic product.

3. The method of claim 1 wherein the edible dairy composition further comprises a) milk, cream or water, b) sweetening agents, c) flavorings, d) binding agents and e) emulsifying agents along with the highly refined cellulose.

4. The method of claim 1 wherein the edible dairy composition comprises a soft cheese.

5. The method of claim 1 wherein the edible dairy composition comprises a cheese spread.

6. The method of claim 1 wherein the edible dairy composition comprises a cheese sauce.

7. The method of claim 1 wherein the edible dairy composition comprises a cheese selected from the group consisting of Cheddar cheese, Colby cheese, Monterey Jack, Havarti cheese, Parmesan cheese, Muenster cheese, Brick cheese, Gouda cheese, and Mozzarella cheese.

8. The method of claim 1 wherein the edible dairy composition comprises an ice cream.

9. The method of claim 1 wherein the fiber mass of the highly refined cellulose consists essentially of at least 50% by weight of fiber mass from organic products selected from the group consisting of sugar beets, citrus fruit, grapes, tomatoes, chicory, potatoes, pineapple, apple, carrots and cranberries and the aqueous solution is free of refinement process introduced metal or metallic hydroxides.

10. The method of claim 9 wherein i) and ii) are blended to distribute ingredients essentially uniformly throughout a blended mixture with high parenchymal cell wall derived cellulosic product.

11. The method of claim 1 wherein the mixture is formed with 1-30% by weight of highly refined cellulose fiber, and wherein the highly refined cellulose fiber has soaked in an aqueous solution free of refinement process introduced metal or metallic hydroxides.

12. The method of claim 11 wherein the fiber mass of the highly refined cellulose consists essentially of at least 50% by weight of fiber mass from organic products selected from the group consisting of sugar beets, citrus fruit, grapes, tomatoes, chicory, potatoes, pineapple, apple, carrots and cranberries.

13. The method of claim 12 wherein i) and ii) are blended to distribute ingredients essentially uniformly throughout a blended mixture with high parenchymal cell wall derived cellulosic product.

14. The method of claim 11 wherein i) and ii) are blended to distribute ingredients essentially uniformly throughout a blended mixture with high parenchymal cell wall derived cellulosic product.

* * * * *